US012457426B2

(12) United States Patent
Jang et al.

(10) Patent No.: US 12,457,426 B2
(45) Date of Patent: Oct. 28, 2025

(54) APPARATUS AND METHOD FOR OBTAINING IMAGE EMPLOYING COLOR SEPARATION LENS ARRAY

(71) Applicant: SAMSUNG ELECTRONICS CO., LTD., Suwon-si (KR)

(72) Inventors: Soongeun Jang, Suwon-si (KR); Woo-Shik Kim, Suwon-si (KR); Haim Azaria, Tivo'n (IL); Gal Bitan, Shoham (IL); Igal Avishai, Hertzlia (IL); Lena Grechikhin, Giva'tayim (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 18/414,132

(22) Filed: Jan. 16, 2024

(65) Prior Publication Data

US 2024/0244333 A1   Jul. 18, 2024

(30) Foreign Application Priority Data

Jan. 17, 2023  (KR) ................. 10-2023-0006980
Feb. 17, 2023  (KR) ................. 10-2023-0021591

(51) Int. Cl.
*H04N 23/84* (2023.01)
*H04N 23/16* (2023.01)
(Continued)

(52) U.S. Cl.
CPC .......... *H04N 23/843* (2023.01); *H04N 23/16* (2023.01); *H04N 23/683* (2023.01); *H04N 23/88* (2023.01)

(58) Field of Classification Search
CPC ...... H04N 23/843; H04N 23/88; H04N 23/95; H04N 1/6077; G06T 3/4015; G06T 5/73; G06T 5/75; G06T 7/13–194
(Continued)

(56) References Cited

U.S. PATENT DOCUMENTS 6,642,962 B1   11/2003   Lin et al.
6,983,080 B2    1/2006   Wenstrand et al.
(Continued)

FOREIGN PATENT DOCUMENTS

JP    2001-250931 A    9/2001
KR  10-2007-0102399 A  10/2007
(Continued)

OTHER PUBLICATIONS

Chang Won Kim et al., "Region Adaptive Color Demosaicing Algorithm Using Color Constancy", EURASIP Journal on Advances in Signal Processing, vol. 2010, No. 1, Article No. 271078, Apr. 13, 2010, 18 pages, DOI: 10.1155/2010/271078, XP093161073.
(Continued)

*Primary Examiner* — Anthony J Daniels
(74) *Attorney, Agent, or Firm* — Sughrue Mion, PLLC

(57) ABSTRACT

Provided is an apparatus for obtaining an image includes an image sensor and a signal processing unit that includes a demosaicing unit configured to reconstruct a green signal to have a full pixel resolution by using the input image, a sharpening filter unit configured to generate a first image by sharpening the reconstructed green signal for each preset direction, a direction image generation unit which generates a second image by removing a base band and extracting only a detail band, a gray detection unit configured to detect a gray region of the white balance-processed input image, an edge detection unit configured to detect an edge direction of the white balance-processed input image, and a selection unit configured to generate a third image by blending the first image and the second image, based on the detected gray region and the detected edge direction.

20 Claims, 23 Drawing Sheets

(51) Int. Cl.
*H04N 23/68* (2023.01)
*H04N 23/88* (2023.01)

(58) Field of Classification Search
USPC .................................................. 348/221.1
See application file for complete search history.

(56) References Cited

U.S. PATENT DOCUMENTS

| | | |
|---|---|---|
| 7,796,814 B2 | 9/2010 | Sato et al. |
| 9,392,236 B2 | 7/2016 | Artyomov et al. |
| 11,558,587 B2 | 1/2023 | Jang et al. |
| 2004/0013319 A1 | 1/2004 | Wenstrand et al. |
| 2020/0184607 A1* | 6/2020 | Hwang ............... G06T 5/20 |
| 2021/0125301 A1 | 4/2021 | Park et al. |
| 2024/0104912 A1* | 3/2024 | Kim ................. G06V 10/87 |

FOREIGN PATENT DOCUMENTS

| | | | |
|---|---|---|---|
| KR | 10-2014-0055503 A | 5/2014 | |
| KR | 10-2019-0051371 A | 5/2019 | |

OTHER PUBLICATIONS

Communication issued on Jun. 4, 2024 by the European Patent Office for European Patent Application No. 24152375.2.

* cited by examiner

APPARATUS AND METHOD FOR OBTAINING IMAGE EMPLOYING COLOR SEPARATION LENS ARRAY

CROSS-REFERENCE TO RELATED APPLICATION

This application claims priority to Korean Patent Application No. 10-2023-0006980, filed on Jan. 17, 2023, and Korean Patent Application No. 10-2023-0021591, filed on Feb. 17, 2023, in the Korean Intellectual Property Office, the disclosures of which are incorporated by reference herein in their entireties.

BACKGROUND

1. Field

Example embodiments of the present disclosure relate to an apparatus and method for obtaining an image, employing a color separation lens array.

2. Description of Related Art

Image sensors are arranged to have a certain pattern of color filters of red, green, and blue colors on top of light sensing cells for imaging. For example, a Bayer pattern structure may be applied so that 50% of the green color and 25% of each of the red and blue colors cross-arranged in consideration of the vision/visual characteristics of humans sensitive to the green color. Since the color filter absorbs light of the remaining colors except for the light of the corresponding color, light utilization efficiency may be reduced.

Since a color separation lens array is formed to have a phase distribution that concentrates light of different wavelengths in adjacent light sensing cells, incident light may be separated and concentrated according to color. Accordingly, since image sensors including color separation lens arrays may additionally receive light through optical paths of peripheral pixels, light utilization efficiency may be increased.

However, image sensors including color separation lens arrays may cause blur, grid artifacts, and color mixing, which may reduce spatial resolution.

SUMMARY

One or more example embodiments provide an apparatus and method for obtaining an image, which are capable of improving spatial resolution while using a color separation lens array.

Additional aspects will be set forth in part in the description which follows and, in part, will be apparent from the description, or may be learned by practice of the example embodiments of the disclosure.

According to an aspect of an example embodiment, there is provided an apparatus for obtaining an image, including an image sensor including a color separation lens array configured to separate and concentrate incident light based on a color of the incident light, and a signal processor configured to process an input image obtained by the image sensor, wherein the signal processor configured to be implemented as a demosaicing unit configured to reconstruct a green signal to have a full pixel resolution based on the input image, a sharpening filter unit configured to generate a first image by sharpening the reconstructed green signal for each preset direction, a direction image generation unit configured to perform white balance processing on the input image, and generate a second image by removing a base band and extracting a detail band from the white balance-processed input image for each preset direction based on an unsharpening filtering algorithm, a gray detection unit configured to perform white balance processing on the input image and detect a gray region of the white balance-processed input image, an edge detection unit configured to perform white balance processing on the input image and detect an edge direction of the white balance-processed input image, and a selection unit configured to generate a third image by blending the first image and the second image based on the detected gray region and the detected edge direction.

The image sensor may include a sensor substrate including a plurality of light sensing cells configured to sense light, and the color separation lens array may be on the sensor substrate and includes a microstructure that forms a phase distribution configured to concentrate light of different wavelengths in light sensing cells, among the plurality of light sensing cells, adjacent to each other.

The image sensor may include a Bayer pattern array.

The signal processor may be further configured to be implemented as an adjustment unit configured to adjust a red signal and a blue signal, based on an amount of change of the green signal of the third image.

The signal processor may be further configured to be implemented as a Bayer recombination unit configured to combine the green signal of the third image with the adjusted red signal and the adjusted blue signal to generate a fourth image having a Bayer pattern array.

The signal processor may be further configured to be implemented as a phasor unit configured to detect an edge direction of the reconstructed green signal.

The selection unit may be further configured to increase an edge resolution of the first image corresponding to the edge direction detected by the phasor unit based on an edge strength of the reconstructed green signal being greater than or equal to a preset value.

The selection unit may be further configured to determine, by the gray detection unit, whether the gray region exists in the white balance-processed input image based on the edge strength of the reconstructed green signal being greater than or equal to the preset value.

The selection unit may be further configured to, based on the gray region existing in the white balance-processed input image, increase edge resolution based on the second image corresponding to the edge direction determined by the edge detection unit and generate the third image by blending the first image and the edge resolution increased second image.

The selection unit may be further configured to determine, by the gray detection unit, whether the gray region exists in the white balance-processed input image based on the edge strength of the reconstructed green signal being less than the preset value.

The selection unit may be further configured to, based on the gray region existing in the white balance-processed input image, increase edge resolution based on the second image corresponding to the edge direction determined by the edge detection unit and generate the third image by blending the reconstructed green signal and the edge resolution increased second image.

The preset direction may include a horizontal direction, a vertical direction, a 45° direction, and a 135° direction.

The direction image generation unit may include a low-pass filter configured to generate a fifth image by performing low-frequency filtering on the white balance-processed input image, and an operator configured to receive the white balance-processed input image and the fifth image, and subtract the fifth image from the white balance-processed input image.

The direction image generation unit may further include a multiplier between the low-pass filter and the operator, the multiplier being configured to multiply the fifth image by a gain.

The direction image generation unit may further include a high-pass filter configured to detect a limit resolution of the white balance-processed input image.

The edge detection unit may include a low-pass filter configured to remove noise from the white balance-processed input image.

The selection unit may be further configured to generate the third image based on field information corresponding to a chief ray angle of the image sensor.

The direction image generation unit, the gray detection unit, and the edge detection unit may be disposed in parallel and share a memory with the demosaicing unit.

According to another aspect of an example embodiment, there is provided a method of obtaining an image in an apparatus configured to obtain an image, the apparatus including an image sensor including a color separation lens array configured to separate and concentrate incident light based on a color of the incident light, the method including demosaicing a green signal to reconstruct the green signal to have a full pixel resolution based on the input image, generating a first image by sharpening the reconstructed green signal for each preset direction, performing white balance processing on the input image, generating a second image by removing a base band and extracting a detail band from the white balance-processed input image for each preset direction based on an unsharpening filtering algorithm, detecting a gray region of the white balance-processed input image, detecting an edge direction of the white balance-processed input image, and generating a third image by blending the first image and the second image based on the detected gray region and the detected edge direction.

The method may further include adjusting a red signal and a blue signal based on an amount of change of the green signal of the third image.

BRIEF DESCRIPTION OF THE DRAWINGS

The above and other aspects, features, and advantages of example embodiments of the disclosure will be more apparent from the following description taken in conjunction with the accompanying drawings, in which.

DETAILED DESCRIPTION

Figure 1:
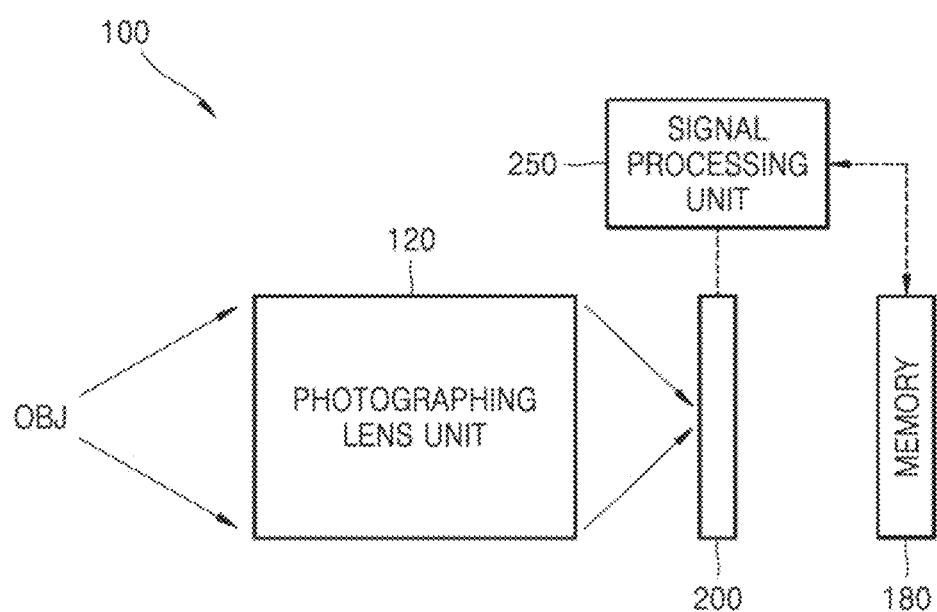
FIG. 1 schematically illustrates a configuration of an apparatus for obtaining images, according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. In the following drawings, the same reference numerals refer to the same components, and the size of each component in the drawings may be exaggerated for clarity and convenience of description. The embodiments described below are merely examples and various modifications are possible from these embodiments.

Hereinafter, the term "upper portion" or "on" may also include "to be present above on a non-contact basis" as well as "to be on the top portion in directly contact with". The singular expression includes plural expressions unless the context clearly implies otherwise. In addition, when a part "includes" a component, this means that it may further include other components, not excluding other components unless otherwise opposed. The use of the term "the" and similar indicative terms may correspond to both singular and plural.

FIG. 1 schematically illustrates a configuration of an apparatus for obtaining an image according to an example embodiment.

Referring to FIG. 1, the apparatus for obtaining an image 100 may include an image sensor 200 that acquires a color image signal by converting, to an electrical signal, an optical image formed by a photographing lens unit 120 by focusing light reflected from an object OBJ, and a signal processing unit 250 that generates an output signal by processing the color image signal acquired by the image sensor 200. The signal processing unit 250 may include one or more processors. The apparatus for obtaining an image 100 may further include a memory 180 and the like for storing an image signal for each color and an image formed by the signal processing unit 250. An additional optical element, such as an infrared blocking filter, may be further arranged between the image sensor 200 and the photographing lens unit 120.

Figure 2:
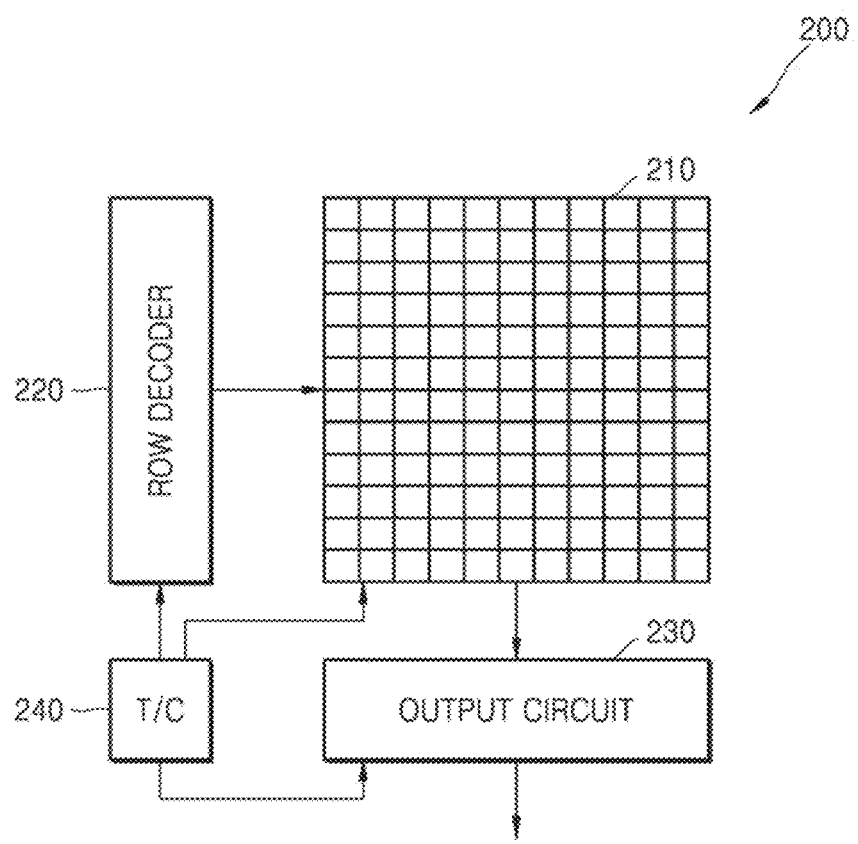
FIG. 2 is a block diagram of an image sensor according to an example embodiment.

FIG. 2 is a schematic block diagram of an image sensor according to an embodiment.

Referring to FIG. 2, the image sensor 200 may include a pixel array 210, a timing controller 240, a row decoder 220, and an output circuit 230. The image sensor 200 may be a charge coupled device (CCD) image sensor or a complementary metal oxide semiconductor (CMOS) image sensor.

The pixel array 210 includes pixels arranged in two dimensions along a plurality of rows and columns. The row decoder 220 selects one of the rows of the pixel array 210 in response to a row address signal output from the timing controller 240. The output circuit 230 outputs a light sensing signal in units of columns from a plurality of pixels arranged along the selected row. To this end, the output circuit 230 may include a column decoder and an analog to digital converter (ADC). For example, the output circuit 230 may include a plurality of ADCs placed on each column between the column decoder and the pixel array 210, or one ADC placed on the output end of the column decoder. The timing controller 240, the row decoder 220, and the output circuit 230 may be implemented as one chip or respective separate chips. The signal processing unit 250 of FIG. 1 for processing the image signal output through the output circuit 230 may be implemented as a single chip along with the timing controller 240, the row decoder 220, and the output circuit 230.

The pixel array 210 may include a plurality of pixels that sense light of different wavelengths. The arrangement of pixels may be implemented in various ways.

Figure 3:
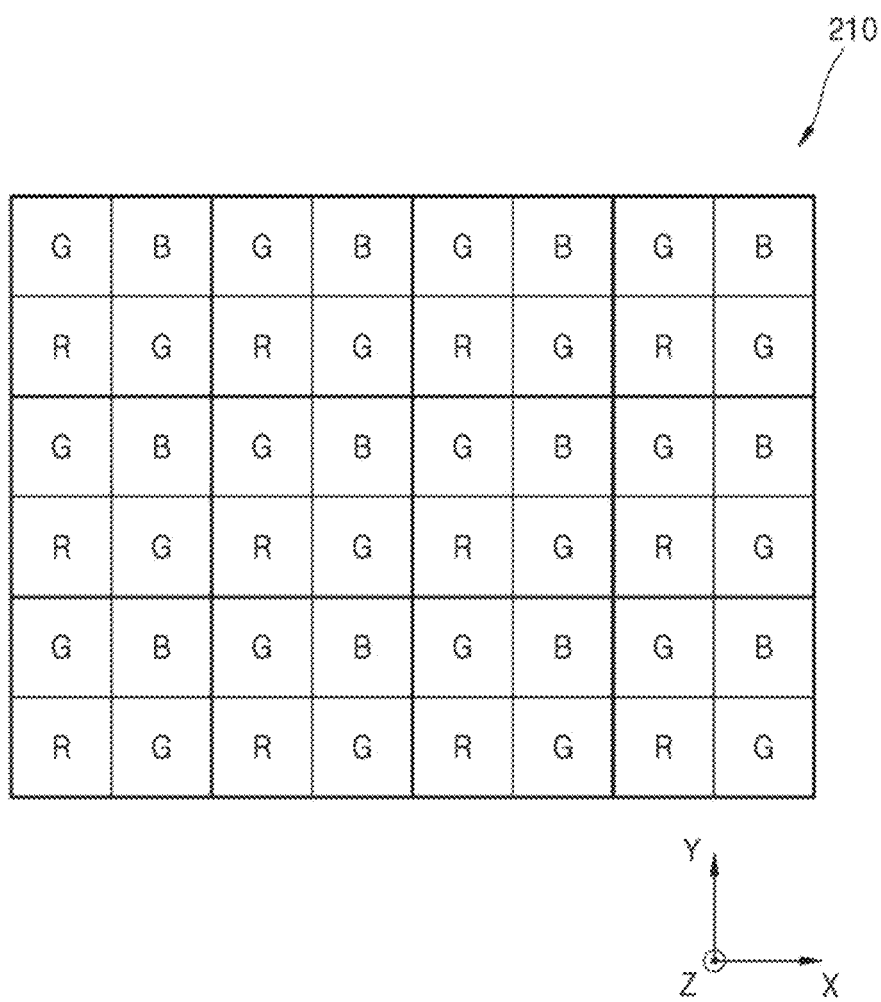
FIG. 3 is a diagram illustrating a Bayer pattern, as a pixel arrangement of a pixel array of an image sensor.

FIG. 3 is a diagram illustrating a Bayer pattern, as a pixel arrangement of a pixel array of an image sensor.

Referring to FIG. 3, one unit pixel includes four quadrant regions, and the first to fourth quadrants may be blue pixels B, green pixels G, red pixels R, and green pixels G, respectively. These unit pixels are two-dimensionally and repeatedly arranged in the first direction (X direction) and the second direction (Y direction). For example, two green pixels G are placed in one diagonal direction within a unit pixel in the form of a 2×2 array, and one blue pixel B and one red pixel R are placed in the other diagonal direction, respectively. In the overall pixel arrangement, a first row in which a plurality of green pixels G and a plurality of blue pixels B are alternately arranged in the first direction, and a second row in which a plurality of red pixels R and a plurality of green pixels G are alternately arranged in the first direction are repeatedly arranged in the second direction.

Figure 4:
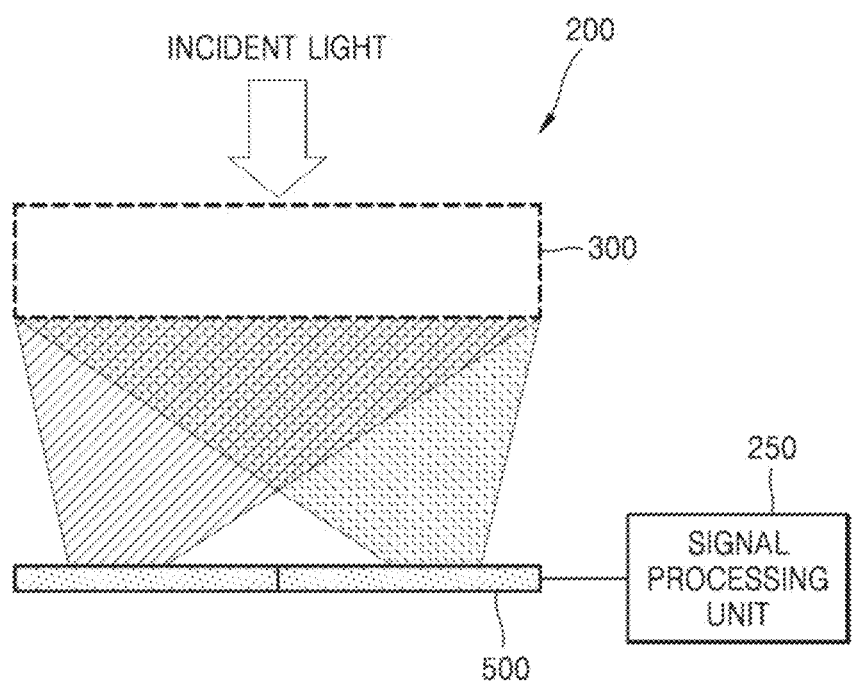
FIGS. 4 and 5 schematically illustrate an image sensor according to an example embodiment.
Figure 5:
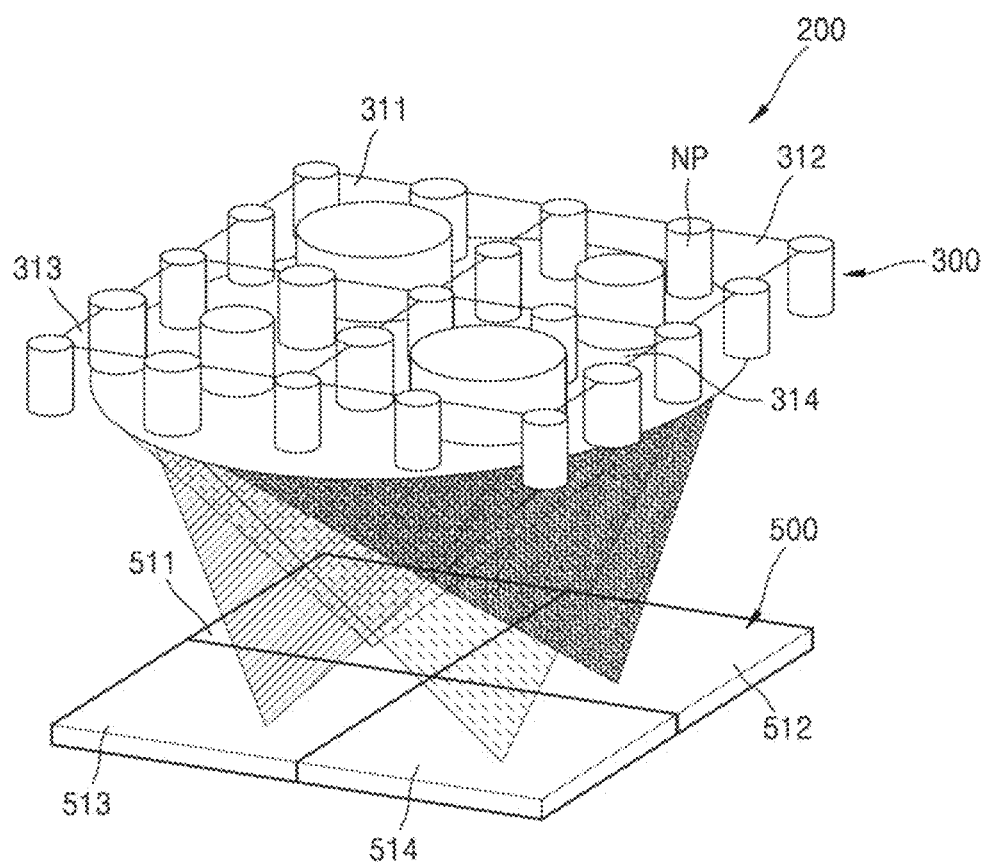
Figure 6:
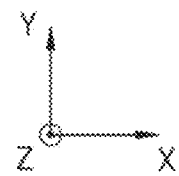
FIG. 6 is a plan view schematically illustrating an arrangement of light sensing cells in a pixel array of an image sensor.
Figure 7:
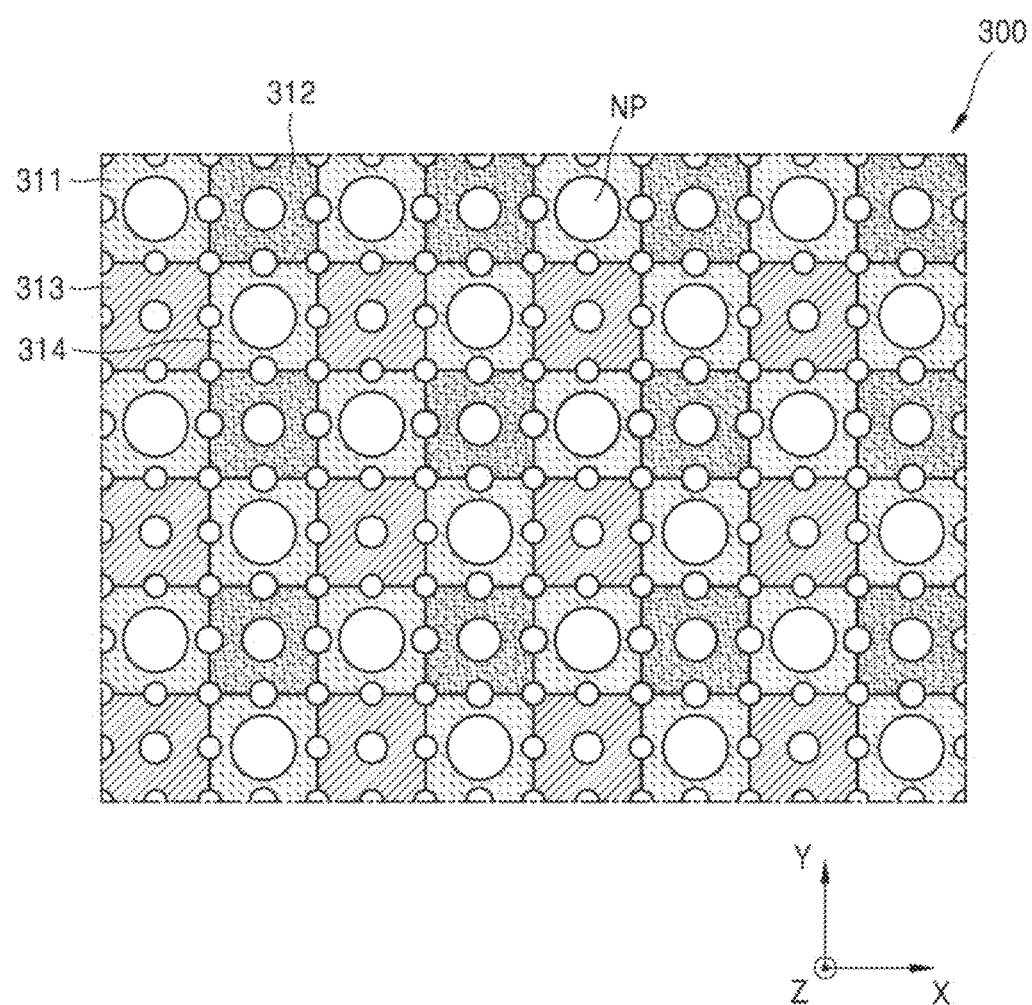
FIG. 7 is a plan view illustrating a form in which a plurality of nanoposts are arranged in a plurality of regions of a color separation lens array to correspond to the arrangement of light sensing cells on a sensor substrate of an image sensor.

FIGS. 4 and 5 schematically illustrate an image sensor according to an example embodiment. FIG. 6 is a plan view schematically illustrating an arrangement of light sensing cells in a pixel array of an image sensor. FIG. 7 is a plan view illustrating a form in which a plurality of nanoposts are arranged in a plurality of regions of a color separation lens array to correspond to the arrangement of light sensing cells on a sensor substrate of an image sensor.

Referring to FIGS. 3 to 5, the pixel array 210 of the image sensor 200 includes a sensor substrate 500 including an array of a plurality of light sensing cells for sensing light, and a color separation lens array 300 arranged at the front end of the sensor substrate 500 to separate and concentrate light according to a color to thus be incident to the plurality of light sensing cells.

The sensor substrate 500 of the image sensor 200 may include a first light sensing cell 511, a second light sensing cell 512, a third light sensing cell 513, and a fourth light sensing cell 514 that convert light into an electrical signal. Unit pixels of the first light sensing cell 511, the second light sensing cell 512, the third light sensing cell 513, and the fourth light sensing cell 514 may be repeatedly arranged in two dimensions. When the pixel array 210 of the image sensor 200 has a Bayer pattern, for example, the first light sensing cell 511 and the fourth light sensing cell 514 may each correspond to a green pixel G, one of the second light sensing cell 512 and the third light sensing cell 513 may correspond to a red pixel R, and the other may correspond to a blue pixel B.

The color separating lens array 300 is provided to have a microstructure in each of a plurality of regions 311, 312, 313, and 314 facing each of the plurality of light sensing cells 511, 512, 513, and 514 to form a phase distribution for concentrating light of different wavelengths in the adjacent light sensing cells, thereby separating and concentrating incident light according to a color. As shown in FIG. 5, the microstructure of the color separation lens array 300 may include a plurality of nanoposts arranged to distribute one or more nanoposts NPs to form a phase distribution that concentrates light of different wavelengths in adjacent light sensing cells. As another example, the microstructure of the color separation lens array 300 may be formed in a pattern to form a phase distribution that concentrates light of different wavelengths in adjacent light sensing cells. Hereinafter, a case in which the microstructure is made of nanoposts will be described as an example.

The color separation lens array 300 may include a plurality of regions 311, 312, 313, and 314 that face and correspond one-on-one to the plurality of light sensing cells 511, 512, 513, and 514 on the sensor substrate 500. For example, the color separation lens array 300 may include first to fourth regions 311, 312, 313, and 314 that face and correspond one-on-one to the first to fourth light sensing cells 511, 512, 513, and 514 of the sensor substrate 500, and the first to fourth areas 311, 312, 313, and 314 may include first to fourth micro structures to form a phase distribution which concentrates light of different wavelengths in the adjacent light sensing cells.

When the first to fourth microstructures each include one or more nanoposts, as shown in FIG. 5, the first region 311 may include one or more first nanoposts, the second region 312 may include one or more second nanoposts, the third region 313 may include one or more third nanoposts, and the fourth region 314 may include one or more fourth nanoposts. Based on the shape, size, and arrangement of the first to fourth nanoposts, a phase is formed such that light of a certain wavelength passing through the color separation lens array 300 is concentrated into a light sensing cell corresponding to one of the first to fourth light sensing cells 511, 512, 513, and 514. The shape, size, and arrangement of the first to fourth nanoposts may be determined to form a phase in which light of a certain wavelength passing through the color separation lens array 300 is not concentrated on the remaining light sensing cells. In addition, the plurality of regions provided in the color separation lens array 300 each include a plurality of sub-regions, and the plurality of nanoposts may be arranged in the plurality of sub-regions. In addition, the plurality of nanoposts may be arranged at intersections between the pluralities of sub-regions. However, embodiments are not limited thereto.

The image sensor 200 may have a pixel arrangement structure in which unit pixels are repeatedly arranged. For example, the image sensor 200 may have a Bayer pattern structure in which unit pixels in which four quadrant regions include blue pixels, green pixels, red pixels, and green pixels, respectively, are two-dimensionally repeatedly arranged in the first and second directions. In this case, for example, among the plurality of nanoposts of the color separation lens array 300, the nanoposts provided in the center portion of the region corresponding to the green pixel among the plurality of regions may have a cross-sectional area larger than the nanoposts provided in the center portions of the regions corresponding to the other color pixels. In addition, among the plurality of nanoposts, the nanoposts provided in the boundary portions of the region corresponding to the green pixel among the plurality of regions may have a smaller cross-sectional area than the nanoposts placed in the center portions of the regions corresponding to the other color pixels. In addition, the nanoposts in the region corresponding to the green pixel among the plurality of regions may have different distribution rules in the first and second directions, and the nanoposts in the regions corresponding to the blue and red pixels among the plurality of regions may have symmetrical distribution rules in the first and second directions. As another example, the nanoposts provided in the center portion of the region corresponding to the blue pixel or the red pixel may have a larger cross-sectional area than the nanoposts provided in the center portion of the region corresponding to the other color pixel.

For example, the first light sensing cell 511 may sense light of the first wavelength corresponding to the first pixel, the second light sensing cell 512 may sense light of the second wavelength corresponding to the second pixel, the third light sensing cell 513 may sense light of the third wavelength corresponding to the third pixel, and the fourth light sensing cell 514 may sense light of the fourth wavelength corresponding to the fourth pixel. However, embodiments are not limited thereto. At the boundary between cells, a separator for cell separation may be further formed.

In the image sensor 200, when the first pixel, the second pixel, the third pixel, and the fourth pixel are green pixels G, blue pixels B, red pixels R, and green pixels G, and are arranged to have a Bayer pattern arrangement, the first light sensing cell 511, the second light sensing cell 512, and the third light sensing cell 513, and the fourth light sensing cell 514 are arranged in correspondence to the Bayer pattern arrangement on the sensor substrate 500.

The color separation lens array 300 is configured to separate and concentrate incident light according to colors to enter the plurality of light sensing cells, such as the first to fourth light sensing cells 511, 512, 513, and 514, and may include arrays of the plurality of nanoposts NP as shown in FIG. 5.

For example, the color separation lens array 300 may separate and concentrate incident light according to a color of the incident light so that light of a first wavelength is incident to the first light sensing cell 511 to form a green pixel G, light of a second wavelength is incident to a second light sensing cell 512 to form a blue pixel B, light of a third wavelength is incident to the third light sensing cell 513 to form a red pixel R, and light of a first wavelength is incident to the fourth light sensing cell 514 to form a green pixel G.

The color separation lens array 300 includes a nanopost array in which a plurality of nanoposts NP are arranged based on a predetermined rule. The nanopost array may be supported by a spacer layer. The spacer layer may maintain a constant interval between the sensor substrate 500 and the color separation lens array 300. The spacer layer may be spaced as much as necessary to secure a focal length to each light sensing cell of light passing through the color separation lens array 300. Compared to a combination of existing microlens array and color filters, the spacer layer according to an example embodiment using the color separation lens array 300 may require a thicker gap between the sensor substrate 500 and the color separation lens array 300 to implement color separation and concentration. In addition, the spacer layer may be made of a material that is transparent to visible light. For example, the spacer layer may be made of a dielectric material such as silicon oxide ($SiO_2$) and siloxane-based spin on glass (SOG) with a lower refractive index and a lower absorption rate in visible light bands than the refractive index and absorption rate of the nanoposts NP of the color separation lens array 300.

The color separation lens array 300 may further include a protective layer for protecting the plurality of nanoposts NP. The protective layer may be formed of a dielectric material having a refractive index lower than a refractive index of a material forming the nanoposts NP. In addition, the color separation lens array 300 may further include a color filter between the spacer layer and the sensor substrate 500. For example, when the first pixel, the second pixel, the third pixel, and the fourth pixel are the green pixel G, the blue pixel B, the red pixel R, and the green pixel G, respectively, green color filters are placed on the first light sensing cell 511 and the fourth light sensing cell 514 of the sensor substrate 500, a blue color filter is placed on the second light sensing cell 512, and a red color filter is placed on the third light sensing cell 513. Color filters may be used for various purposes, but using color filters, for example, may be easier to generate images with existing image signal processing technology for signals in each wavelength band that have passed through the color filters.

The pixel array 210 of the image sensor 200 may have a two-dimensional arrangement. For example, as shown in FIG. 6, the plurality of first light sensing cells 511, the plurality of second light sensing cells 512, the plurality of third light sensing cells 513, and the plurality of fourth light sensing cells 514 may be two-dimensionally arranged in a first direction (X direction) and a second direction (Y direction) in order to alternately repeat a first row in which the first light sensing cells 511 and the second light sensing cells 512 are alternately arranged and a second row in which the third light sensing cells 513 and the fourth light sensing cells 514 are alternately arranged. In this case, when the arrangement of the pixel array 210 of the image sensor 200 is a Bayer pattern arrangement as shown in FIG. 3, the first light sensing cell 511 and the fourth light sensing cell 514 correspond to the green pixel G, the second light sensing cell 512 correspond to the blue pixel B, and the third light sensing cell 513 correspond to the red pixel R. As shown in FIG. 7, the nanopost array of the color separation lens array 300 may be divided into the plurality of regions 311, 312, 313, and 314 to correspond one-on-one to the arrangement of the first to fourth light sensing cells 511, 512, 513, and 514.

For example, when the arrangement of the pixel array of the image sensor 200 is the Bayer pattern arrangement, one unit pixel includes four quadrant regions, and the first to fourth quadrants may be the blue pixels B, the green pixels G, the red pixel R, and the green pixel G, respectively. These unit pixels are two-dimensionally and repeatedly arranged in the first direction (X direction) and the second direction (Y direction).

In the unit pixel, the green pixel G corresponds to the first light sensing cell 511 and the first region 311 of the color separation lens array 300 corresponding to the first light sensing cell 511, the blue pixel B corresponds to the second light sensing cell 512 and the second region 312 of the color separation lens array 300 corresponding to the second light sensing cell 512, the red pixel R corresponds to the third light sensing cell 513 and the third region 313 of the color separation lens array 300 corresponding to the third light sensing cell 513, and the green pixel G corresponds to the fourth light sensing cell 514 and the fourth region 314 of the color separation lens array 300 corresponding to the fourth light sensing cell 514.

Referring to FIG. 7, the nanopost array of the color separation lens array 300 is divided into first to fourth regions 311, 312, 313, and 314 that face and correspond one-on-one to the first to fourth light sensing cells 511, 512, 513, and 514. At least one nanopost NP may be arranged in each of the first to fourth regions 311, 312, 313, and 314, and at least one of a shape, a size, and an arrangement of the nanopost NP may be different according to regions.

The shapes, sizes, and arrangements of the plurality of nanoposts NP of the color separation lens array 300 may be determined so as to form a phase distribution for concentrating light of different wavelengths in the first light sensing cell 511 and the second light sensing cell 512 adjacent to each other on the sensor substrate 500. In addition, the shapes, sizes, and arrangements of the plurality of nanoposts NP of the color separation lens array 300 may be determined so as to form a phase distribution for concentrating light of different wavelengths in the third light sensing cell 513 and the fourth light sensing cell 514 adjacent to each other on the sensor substrate 500.

For example, when the pixel array 210 of the image sensor 200 is a Bayer pattern array, as shown in FIG. 7, the region 311 of the color separation lens array 300 corresponds to the green pixel G, the region 312 of the color separation lens array 300 corresponds to the blue pixel B, the region 313 of the color separation lens array 300 corresponds to the red pixel R, and the region 314 of the color separation lens array 300 corresponds to the green pixel G. The nanoposts NP with different cross-sectional areas may be placed in the center portion of the region of the color separation lens array 300 corresponding to the green pixel G, the blue pixel B, and the red pixel R, and the nanoposts NP with different cross-sectional areas may be arranged at the center portions on the pixel-to-pixel boundary lines and at the intersections between the pixel boundary lines. The cross-sectional area of the nanopost NP arranged at the boundary between pixels may be smaller than that the cross-sectional area of the nanopost NP arranged at the central portion of the pixel.

For example, the cross-sectional areas of the nanoposts NP arranged in the center portions of the regions 311 and 314 of the color separation lens array 300 corresponding to the green pixel G are greater than the cross-sectional area of the nanopost NP arranged in the center portion of the region 312 of the color separation lens array 300 corresponding to the blue pixel B or the region 313 of the color separation lens array 300 corresponding to the red pixel R, and the cross-sectional area of the nanopost NP arranged in the center portion of the region 312 corresponding to the blue pixel B is greater than the cross-sectional area of the nanoposts NP arranged in the center portion of the region 313 corresponding to the red pixel R. However, embodiments are not limited thereto. Here, the cross-sectional area refers to an area of a cross-section perpendicular to the height direction (Z direction) of the nanopost NP.

The nanoposts NP provided in the regions 311 and 314 corresponding to the green pixel G may have different distribution rules in the first direction (X direction) and the second direction (Y direction). For example, the nanoposts NP provided in the regions 311 and 314 corresponding to the green pixel G may have an asymmetric size arrangement in the first direction (X direction) and the second direction (Y direction). As shown in FIG. 7, the cross-sectional area of the nanopost NP located at the boundary of the region 312 corresponding to the blue pixel B adjacent to the regions 311 and 314 corresponding to the green pixel G in the first direction (X direction) is different from the cross-sectional area of the nanopost NP located at the boundary of the region 313 corresponding to the red pixel R adjacent in the second direction (Y direction).

The nanoposts provided in the regions 312 and 313 corresponding to the blue pixel B and the red pixel R may have symmetrical distribution rules in the first direction (X direction) and the second direction (Y direction). As shown in FIG. 7, the region 312 corresponding to the blue pixel B has the same cross-sectional area of the nanoposts NP placed on the boundaries between adjacent pixels in the first direction (X direction) and the second direction (Y direction). In addition, the region 313 corresponding to the red pixel R has the same cross-sectional area of the nanoposts NP placed at the boundaries between adjacent pixels in the first direction (X direction) and the second direction (Y direction).

This distribution is due to differences in the Bayer pattern pixel arrangement, in which pixels adjacent to the blue pixel B and the red pixel R in both the first (X direction) and the second (Y direction) are the same as green pixels G, whereas in the case of green pixels G, adjacent pixels in the first (X direction) are blue pixels B and adjacent pixels in the second (Y direction) are red pixels R. Therefore, in the second and third regions 312 and 313 respectively corresponding to the blue pixel B and the red pixel R, nanoposts NP are arranged in the form of 4-fold symmetry, and in the first and fourth regions 311 and 314 respectively corresponding to the green pixel G, nanoposts NP are arranged in the form of 2-fold symmetry. In particular, the first region 311 and the fourth region 314 may have an arrangement rotated by 90° with respect to each other.

Although FIGS. 5 and 7 show that all of the plurality of nanoposts NP have a symmetrical circular cross-sectional shape, embodiments are not limited thereto. Nanoposts with an asymmetric cross-sectional shape may be partially included. For example, nanoposts with asymmetric cross-sectional shapes with different widths in the first direction (X direction) and the second direction (Y direction) may be employed in regions 311 and 314 corresponding to the green pixels G, and nanoposts with symmetrical cross-sectional shapes with the same widths in the first direction (X direction) and the second direction (Y direction) may be employed in the second region 312 and third region 313 corresponding to the blue pixel B and red pixel R, respectively.

Since the color separation lens array 300 is formed to have a phase distribution that concentrates light of different wavelengths in the light sensing cells 511, 512, 513, and 514 adjacent to each other, it is possible to separate and concentrate incident light according to colors of the incident light. For this reason, the image sensor 200 including the color separation lens array 300 may receive additional light through the optical path of the surrounding pixels, thereby increasing light utilization efficiency.

However, the image sensor 200 including the color separation lens array 300 may cause blur phenomena, grid artifacts, and color mixing phenomena, which may reduce spatial resolution.

Hereinafter, a method of improving spatial resolution by filtering the image signal for each color obtained by the image sensor 200 by the signal processing unit 250 will be described in detail with reference to FIGS. 8 to 13.

Figure 8:
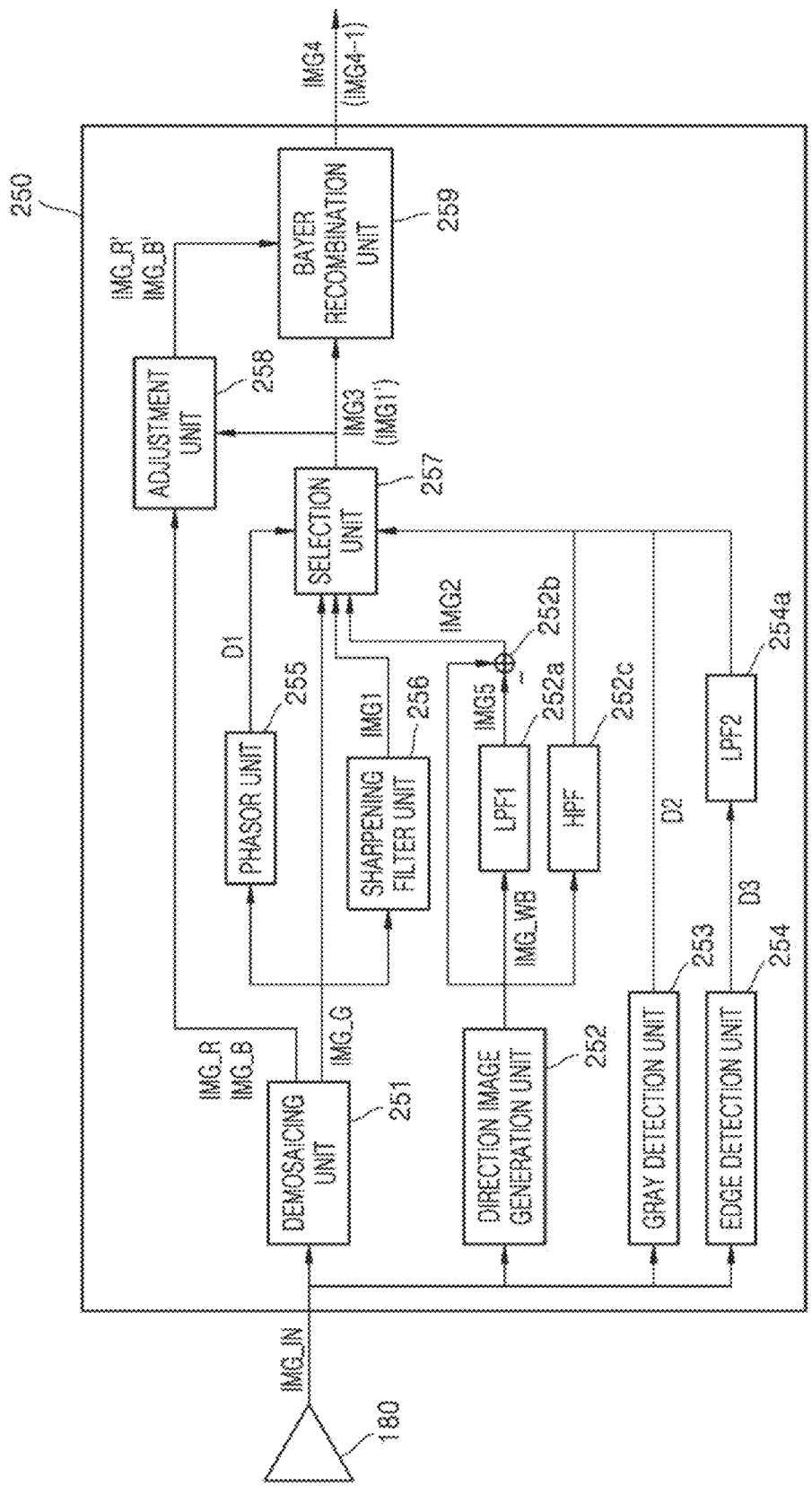
FIG. 8 is a block diagram illustrating operation of a signal processing unit according to an example embodiment.
Figure 9:
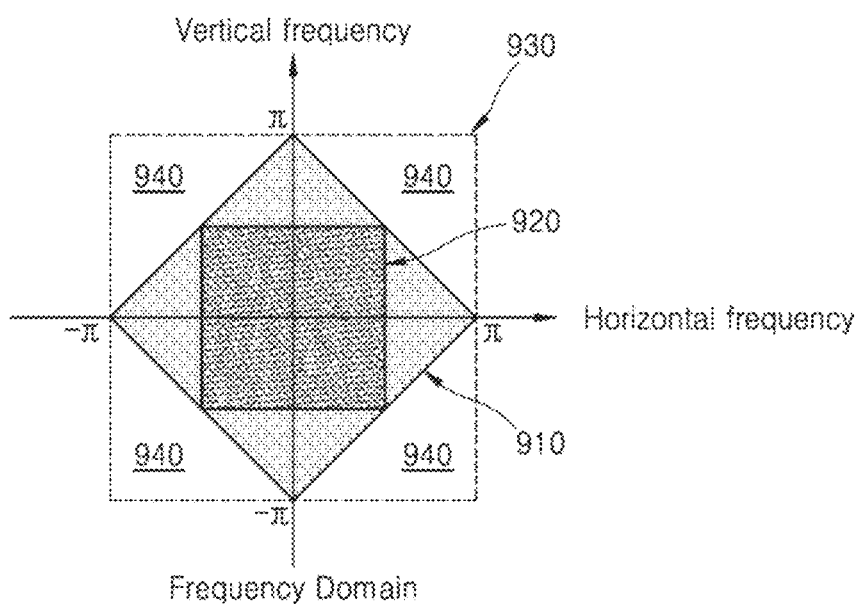
FIG. 9 is a diagram illustrating a frequency region capable of expressing a color through a color filter array of the Bayer pattern of FIG. 3.
Figure 10A:
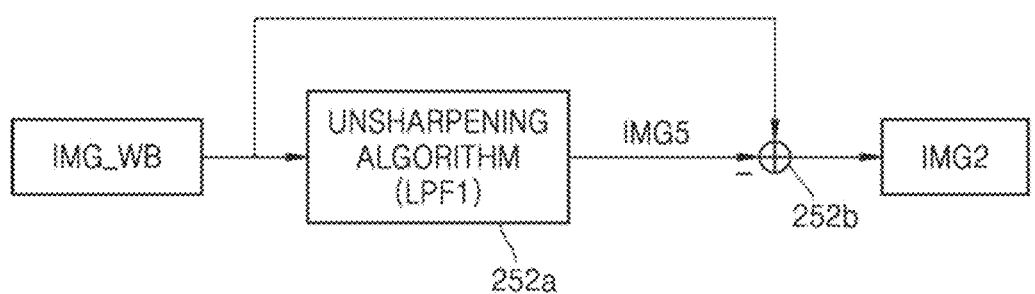
FIGS. 10A and 10B are diagrams for describing an image processing operation performed in a direction image generation unit of FIG. 8.
Figure 10B:
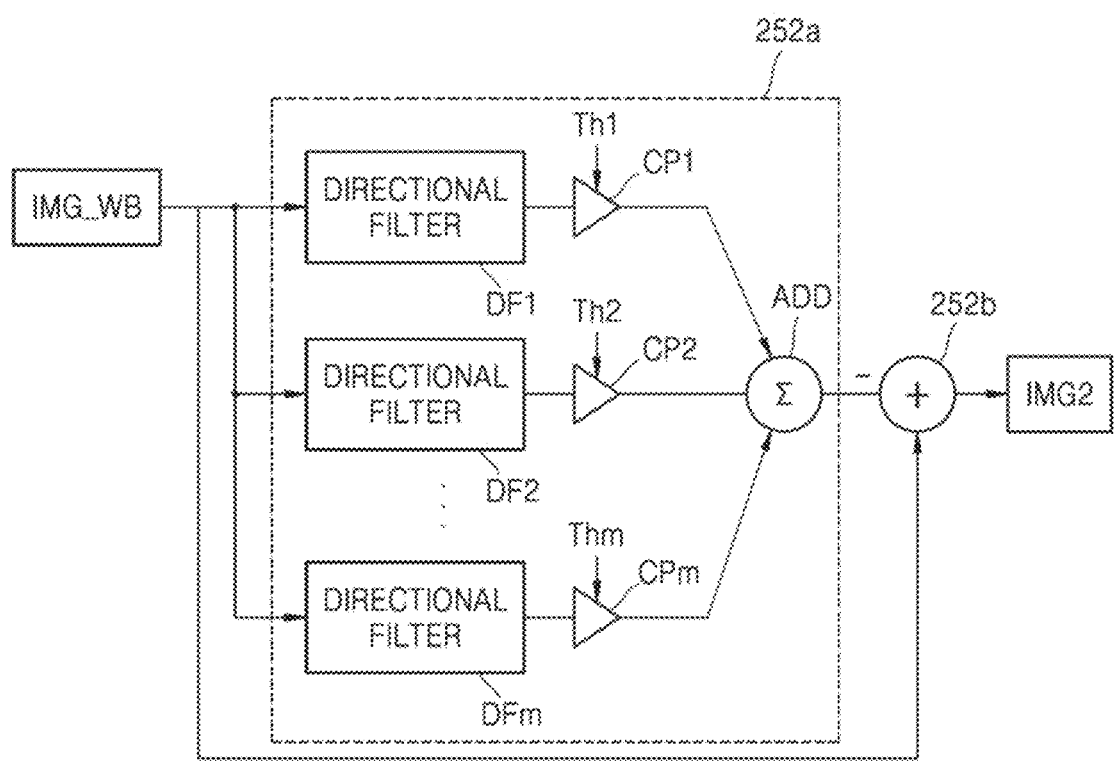

FIG. 8 is a block diagram illustrating an operation of a signal processing unit according to an embodiment. FIG. 9 is a diagram illustrating a frequency region capable of expressing a color through the color filter array of the Bayer pattern of FIG. 3. FIGS. 10A and 10B are diagrams for describing an image processing operation performed in the direction image generation unit of FIG. 8.

Referring to FIG. 8, the signal processing unit 250 according to an example embodiment may include a demosaicing unit 251, a direction image generation unit 252, a gray detection unit 253, an edge detection unit 254, a phasor unit 255, a sharpening filter unit 256, a selection unit 257, an adjustment unit 258, and a Bayer recombination unit 259. In this case, the signal processing unit 250 may be implemented as a software module or a hardware module. In addition, the signal processing unit 250 may be provided in the logic of the image sensor 200 or may be provided in a companion chip.

The demosaicing unit 251 may receive the input image IMG_IN from the memory 180. In order to reduce the capacity of the memory 180 used in the operation, the demosaicing unit 251 may perform color interpolation only on the green signal of the input image IMG_IN to generate a reconstructed green signal IMG_G with full pixel resolution.

In this case, various methods may be applied to the demosaicing algorithm. For example, there are a variety of methods, such as a Bilinear interpolation method, an approach using inter-channel correlation, and a method of increasing spatial resolution using the directivity of edges.

Thereafter, the sharpening filter unit 256 may generate the first image IMG1 by sharpening the green signal IMG_G reconstructed to have the full pixel resolution in each preset direction.

According to an example embodiment, the sharpening filter unit 256 may be provided with a filter for performing a sharpening algorithm that changes an image to have a sharp feeling. For example, one or more high-pass filters may be provided in the sharpening filter unit 256. According to another example embodiment, when an unsharpening masking algorithm is applied, a low-pass filter for passing an image signal through low-pass filtering may be provided in the sharpening filter unit 256.

For image sharpening effects through sharpening filtering algorithms (or unsharpening filtering algorithms), image signals may be processed through a high pass filter, and the mask of the high pass filter may have a positive value of the sum of all coefficients. For example, the center coefficient of the mask may have a positive value, and the peripheral coefficient around the center coefficient may have a negative value. In addition, the sum of all coefficients of the mask may have a value of 0 or more, and as an example, the sum of all coefficients of the mask may have a value of 1.

In addition, the unsharpening method may be applied as one method for the image sharpening effect, and the unsharpening method may obtain an image sharpening effect by reducing the low-frequency component in the image by subtracting the image signal through low-frequency filtering from the original image signal. In describing the sharpening operation according to an embodiment, either a sharpening operation based on the unsharpening filter algorithm as described above or a sharpening operation based on a sharpening filter (or a high pass filter) may be applied.

As in the example embodiment described above, the sharpening filter unit 256 may include one or more sharpening filters (and/or unsharpening filters, hereinafter referred to as concepts including unsharpening filters) for image sharpening effects. The sharpening filter may have a mask value for obtaining an image sharpening effect. For example, the mask of the sharpening filter may have N*N (N is an integer of 2 or more) coefficients.

In addition, according to an example embodiment, one sharpening filter unit 256 may include a plurality of directional filters. The sharpening filter unit 256 may be applied along the edge direction using the directional filters, and the degree of clarity may be adjusted based on the noise level, flatness, luminance level, and texture amount of the image.

In this case, a preset direction for applying the directional filter may be a horizontal direction, a vertical direction, a 45° diagonal direction, and a 135° diagonal direction. For example, the first image IMG1 obtained by sharpening the reconstructed green signal IMG_G may include a first image IMG1 filtered in the horizontal direction, a first image IMG1 filtered in the vertical direction, a first image IMG1 filtered in the 45° diagonal direction, and a first image IMG1 filtered in the 135° diagonal direction.

The phasor unit 255 may detect the edge direction of the reconstructed green signal IMG_G. For example, the phasor unit 255 may detect the edge direction of the image by calculating a differential value along the pixel in the polar coordinate system. When the edge strength of the reconstructed green signal IMG_G is greater than or equal to a preset value, the selection unit 257 may improve the edge of the first image IMG1 corresponding to the edge direction detected by the phasor unit 255. For example, the selection unit 257 may increase the edge resolution and improve an edge of any one first image IMG1 corresponding to the edge direction detected by the phasor unit 255 among the first images IMG1 filtered in the horizontal edge direction, the first image IMG1 filtered in the vertical edge direction, the first image IMG1 filtered in the 45th diagonal edge direction, and the first image IMG1 in the 135th diagonal edge direction. The phasor unit 255 may provide edge direction information D1 of the reconstructed green signal IMG_G to the selection unit 257.

When the selection unit 257 outputs a signal by performing only the process described above, the output signal may be an edge-improved first image IMG1' rather than a third image IMG3 to be described later. Thereafter, the adjustment unit 258 may adjust the red signal IMG_R and the blue signal IMG_B based on the change amount in the green signal of the edge-improved first image IMG1', and the Bayer recombination unit 259 may generate a (4-1)-th image IMG4-1 with a Bayer pattern array when outputting an output signal by combining the green signal of the edge-improved first image IMG1' with the adjusted red signal IMG_R' and the adjusted blue signal IMG_B'. However, the (4-1)-th image IMG4-1 is not a fourth image IMG4 to be described later.

In the case of an image sensor 200 that does not include a color separation lens array 300 in FIG. 5, the signal processing unit 250 can output a (4-1)-th image IMG4-1 with a Bayer pattern array, and may expect sufficient spatial resolution improvement as an output signal. However, in the case of an image sensor 200 including the color separation lens array 300 in FIG. 5 of the example embodiment, there may be limitations in improving spatial resolution due to blur phenomena due or the like to the characteristics of the color separation lens array 300 in FIG. 5.

In more detail, referring to FIG. 9, a region 910 briefly shows a resolution at which green may be expressed as a Nyquist frequency. The region 910 shows a resolution of ½ of the full pixel of the image sensor 200 of FIG. 5 with green.

A region 920 schematically represents, as a Nyquist frequency, a resolution in which red or blue may be expressed. The region 920 shows a resolution of ¼ of the full pixel of the image sensor 200 of FIG. 5 with red or blue. Through the region 920, it may be seen that the range of resolution in which red or blue may be expressed is ½ of the resolution representing green.

The region 930 shows, as a Nyquist frequency, the resolution at which the monochrome signal may be expressed. The region 930 shows that the resolution of all pixels of the image sensor 200 (see FIG. 5) may be represented by a monochrome signal. Through the region 930, it may be seen that the range of resolution in which the monochrome signal may be expressed is twice the resolution expressed by green.

A region 940 indicates a frequency domain of the wasted pixel. For example, there may be a resolution loss of the region 940 from the region 930 that may be expressed as a monochrome signal, except for the region 910 in which green may be expressed. Therefore, even if the spatial resolution is improved based on the green signal IMG_G reconstructed to have the full pixel resolution, a resolution loss as much as the region 940 may occur.

Even if the image sensor 200 has a Bayer pattern color filter array, the resolution (or total band) of all pixels may be obtained for the gray subject in the image, as in a monochrome sensor. To this end, when the image acquired by the image sensor 200 with a Bayer pattern color filter array is white-balance processed, the gray subject in the image may be considered as the gray subject acquired by the monochrome sensor. White balance is to adjust the gain of R and B around G so that the ratio of RGB (Red, Green, Blue) in the gray region is the same under various color temperature lighting (e.g., R=G=B).

Hereinafter, an example method of improving spatial resolution by extracting a wide signal band for a gray subject from an image acquired by the image sensor 200 having the Bayer pattern color filter array will be described.

Referring back to FIG. 8, the direction image generator 252 may perform a white balance process on the input image IMG_IN. The white balance may be correcting a color difference occurring in a difference in color temperature. There may be a difference in color expression according to light (or light source) during image photographing. For example, since the low color temperature is tinged with a red light, and the high color temperature is tinged with a blue light, white balance may be performed to correct the color temperature of the light so that the ideal white color is displayed. White balance is to adjust the gain of R and B around G so that the ratio of RGB (Red, Green, Blue) in the gray region is the same under various color temperature lighting (e.g., R=G=B).

The direction image generation unit 252 may use the unsharpening filtering algorithm to remove the baseband of the white balance-processed input image IMG_WB for each preset direction and to extract only the detail band thereof to thus generate a second image IMG2. In this case, the preset direction may be a horizontal direction, a vertical direction, a 45° diagonal direction, and a 135° diagonal direction. For example, the second image IMG2 may include a second image IMG2 filtered in a horizontal direction, a second image IMG2 filtered in a vertical direction, a second image IMG2 filtered in a 45° diagonal direction, and a second image IMG2 filtered in a 135° diagonal direction.

In detail, referring to FIGS. 10A and 10B, FIG. 10A shows a block diagram for performing an unsharpening filtering algorithm, and FIG. 10B shows an example embodiment of a configuration for performing the unsharpening filtering algorithm of FIG. 10A.

The direction image generation unit 252 may include an unsharpening algorithm execution unit 252a and an operator 252b. The unsharpening algorithm execution unit 252a receives the white balance-processed input image IMG_WB and outputs a result of filtering. In this case, filtering may use a first low pass filter LPF1 for passing an image signal through a low pass filter.

The operator 252b may generate the second image IMG2 by calculating the white balance-processed input image IMG_WB and the output of the unsharpening algorithm execution unit 252a. For example, the operator 252b may generate a second image IMG2 by subtracting the fifth image IMG5, which is the output of the unsharpening algorithm execution unit 252a, from the white balance-processed input image IMG_WB.

As illustrated in FIG. 10B, the unsharpening algorithm execution unit 252a may include one or more directional filters DF1 to DFm, one or more comparators CP1 to CPm, and an adder ADD. In this case, one or more directional filters DF1 to DFm may be defined as a directional filter set.

In order to perform the unsharpening filtering algorithm, one or more directional filters DF1 to DFm may be set according to the mask coefficient of the unsharpening filter. For example, the unsharpening filter may have a predetermined size, and may correspond to a filter having a size of A*A (A is an integer of 2 or more). The total sum of coefficients of one or more directional filters DF1 to DFm may be set to be equal to the mask coefficient of the unsharpening filter. In addition, each of the one or more directional filters DF1 to DFm may have a coefficient value to detect edges in different directions. For example, one or more directional filters DF1 to DFm may have a filter type for detecting an edge in at least one of a horizontal direction, a vertical direction, a 45° diagonal direction, and a 135° diagonal direction.

The size of the unsharpening filter and the size of each of the one or more directional filters DF1 to DFm may be the same or different from each other. For example, each of the directional filters DF1 to DFm may correspond to a filter having an A*A size (A is an integer of 2 or more). According to another example embodiment, each of the directional filters DF1 to DFm may be smaller than the size of the unsharpening filter. The position of each of the directional filters DF1 to DFm may be set so that the total sum of the coefficients of the directional filters DF1 to DFm is set to be equal to the mask coefficient of the unsharpening filter.

One or more comparators CP1 to CPm may compare the output values of one or more directional filters DF1 to DFm with preset thresholds Th1 to Thm to generate the comparison result. For example, the output of the first directional filter DF1 and the first threshold Th1 are provided to the first comparator CP1, and the first comparator CP1 may provide, to an adder ADD, the result of comparing the output of the first directional filter DF1 with the first threshold Th1. For example, the first threshold Th1 may be a value corresponding to a criterion in which the output of the directional filter may be considered sharpening noise, and the first comparator CP1 may output a value corresponding to "0" or provide a value corresponding to an output of the first directional filter DF1 as the adder ADD, according to the result of comparing the output of the first directional filter DF1 with the first threshold value Th1. For example, when the output of the first directional filter DF1 is greater than or equal to the first threshold Th1, the first comparator CP1 may provide a value corresponding to the output of the first directional filter DF1 to the adder ADD.

One or more directional filters DF1 to DFm provide a result of filtering each of the white balance-processed input images IMG_WB. Some of the outputs of one or more directional filters DF1 to DFm may be equal to or greater than a threshold value corresponding to each of the outputs, whereas some others of the outputs of one or more directional filters DF1 to DFm may be less than the threshold value corresponding to each of the outputs. Accordingly, the adder ADD may generate a result of summing only outputs of some of the one or more directional filters DF1 to DFm. In this case, threshold values Th1 to Thm may be the same as or different from each other.

According to the operation described above, in the directional filter set, the outputs of some directional filters may be selectively added according to preset thresholds. The output (or the second image IMG2) of the operator 252b may be generated as a detail band. In this case, the base band is removed from the detail band, and only a minimum signal capable of sharpening may remain.

The direction image generation unit 252 according to an example embodiment may further include a high-pass filter 252c for detecting the limit resolution of the white balance-processed input image IMG_WB.

The gray detection unit 253 may perform white balance processing on the input image IMG_IN and detect a gray region of the white balance-processed input image IMG_WB. The gray detection unit 253 may provide gray region information D2 to the selection unit 257.

The edge detection unit 254 may perform white balance processing on the input image IMG_IN and detect the edge direction of the white balance-processed input image IMG_WB. The edge detection unit 254 according to an example embodiment may detect the edge direction of the white balance-processed input image IMG_WB by sequentially calculating the edge maximum value for each preset direction. For example, the edge detection unit 254 may determine that the edge direction is vertical when the edge maximum value is detected in the horizontal direction, the edge direction is horizontal when the edge maximum value is detected in the vertical direction, the edge direction is 135° when the edge maximum value is detected in the 45° direction, and the edge direction is 45° when the edge maximum value is detected in the 135° direction. The edge detection unit 254 may provide edge direction information D3 of the white balance-processed input image IMG_WB to the selection unit 257.

The edge detection unit 254 according to an example embodiment may further include a second low-pass filter LPF2 for removing noise from the white balance-processed input image IMG_WB.

The selection unit 257 may generate a third image IMG3 by blending the first image IMG1 and the second image IMG2 based on the detected gray region information D2 and the edge direction information D3 of the white balance-processed input image IMG_WB.

When the edge strength of the reconstructed green signal IMG_G is greater than or equal to a preset value, the selection unit 257 may determine the presence or absence of a gray region in the input image IMG_WB white balance-processed by the gray detection unit 253.

When a gray region is present in the white balance-processed input image IMG_WB, the selection unit 257 may improve the edge using the second image IMG2 corresponding to the edge direction determined by the edge detection unit 254, and generate a third image IMG3 by blending the first image IMG1 and the edge-improved second image IMG2.

The selection unit 257 may determine the presence or absence of a gray region in the input image (IMG_WB) white balance-processed by the gray detection unit 253 even when the edge strength of the reconstructed green signal IMG_G is less than a preset value.

When a gray region is present in the white balance-processed input image IMG_WB, the selection unit 257 may improve the edge using the second image IMG2 corresponding to the edge direction determined by the edge detection unit 254, and generate the third image IMG3 by blending the reconstructed green signal IMG_G and the edge-improved second image IMG2.

The adjustment unit 258 may adjust the red signal IMG_R and the blue signal IMG_B based on the change amount of the green signal of the third image IMG3.

The Bayer recombination unit 259 may combine the green signal of the third image IMG3 with the adjusted red signal IMG_R' and the adjusted blue signal IMG_B' to generate a fourth image IMG4 having a Bayer pattern array.

According to an example embodiment, the direction image generation unit 252, the gray detection unit 253, and the edge detection unit 254 may be implemented as a hardware module placed in parallel to share memory with the demosaicing unit 251. Accordingly, the apparatus 100 for obtaining an image may prevent a decrease in an operation speed for improving spatial resolution.

FIGS. 11A to 13B are diagrams illustrating effects of the example embodiments. In this case, FIGS. 11A, 12A, and 13A correspond to the (4-1)-th image IMG4-1 in which only sharpening processing is performed after the demosaicing described above in FIG. 8, and FIGS. 11B, 12B, and 13B correspond to the fourth image IMG4 performed until filtering using monochrome signals after the white balance processing described above in FIG. 8. Both the (4-1)-th image IMG4-1 and the fourth image IMG4 are obtained by photographing star chart using the image sensor 200 including the color separation lens array 300 of the present disclosure.

Figure 11A:
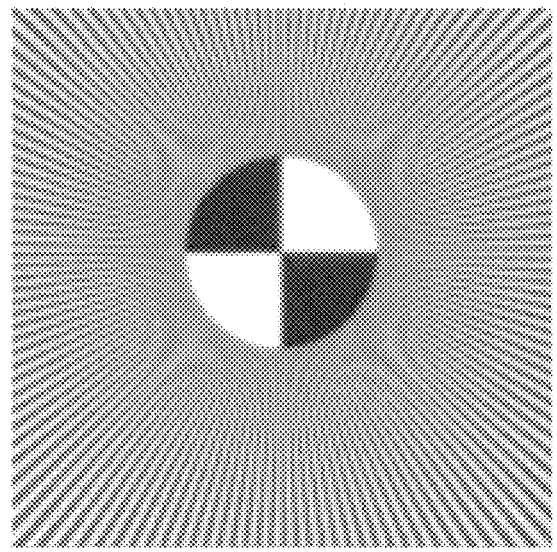
FIGS. 11A, 11B, 12A, 12B, 13A, and 13B are diagrams illustrating effects of the example embodiments.
Figure 12A:
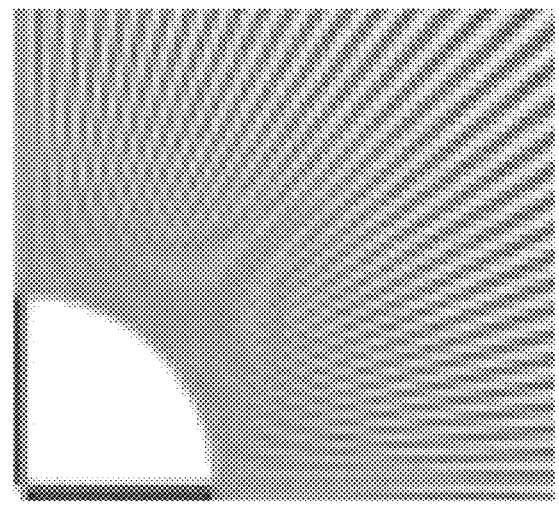
Figure 13A:
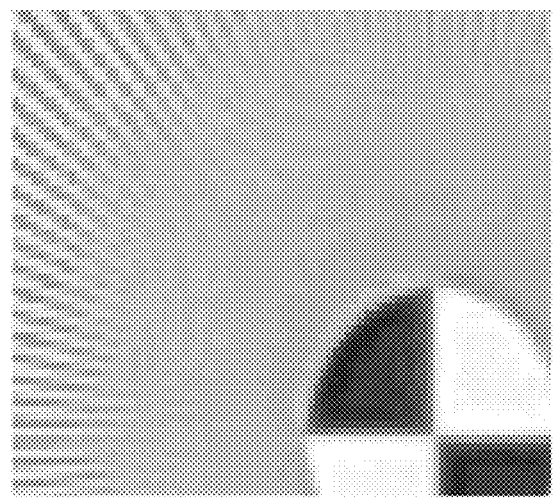

Referring to FIGS. 12A and 13A, which illustrate partial regions of FIG. 11A, it may be seen that lines arranged at narrow intervals along the circumference of the circle are not clearly distinguished in the (4-1)-th image IMG4-1. For example, it may be seen that the maximum spatial resolution region of the (4-1)-th image IMG4-1 is suppressed.

Figure 11B:
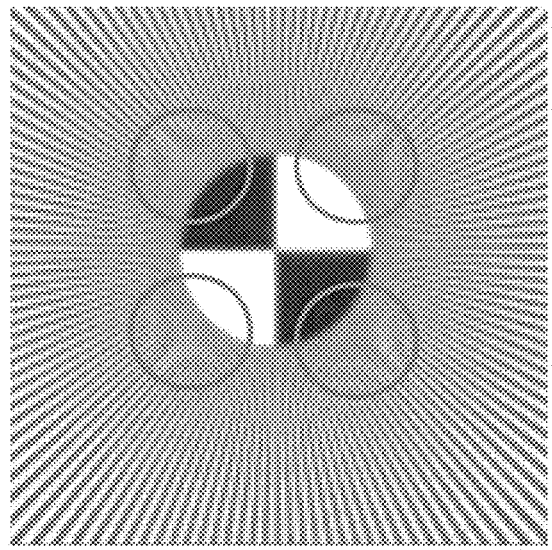
Figure 12B:
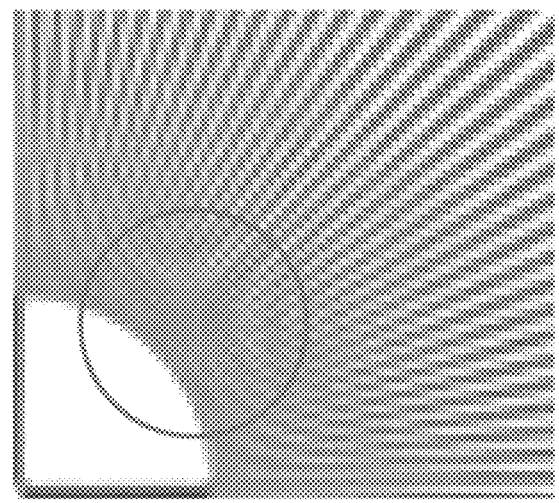
Figure 13B:
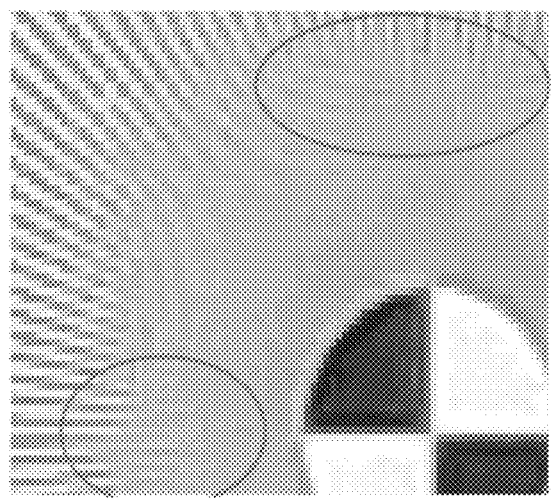

Referring to the circled regions of FIGS. 12B and 13B, respectively, in which some regions of FIG. 11B are enlarged, it may be seen that lines arranged at narrow intervals along the circumference of the circle are more clearly distinguished. For example, it may be confirmed that the maximum spatial resolution of the fourth image IMG4 is restored using the monochrome signal.

In the following example embodiments, the same components as those of the example embodiment described above will be omitted or simplified, and differences will be mainly described.

Figure 14:
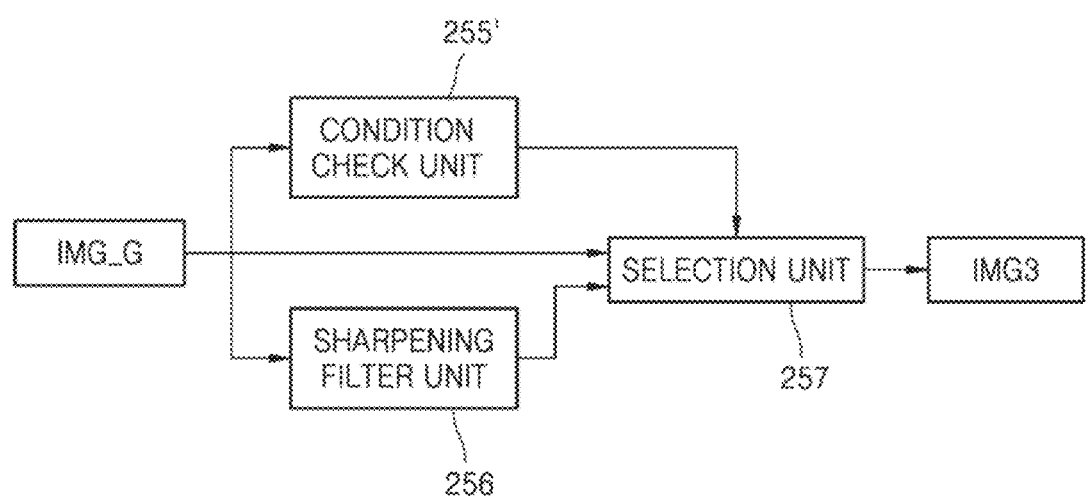
FIG. 14 is a block diagram illustrating an example embodiment using a condition check unit during sharpening processing.

FIG. 14 is a block diagram illustrating an example embodiment using a condition check unit during sharpening processing.

Referring to FIGS. 8 and 14, the example embodiment shown in FIG. 14 is different from the embodiment shown in FIG. 8 in that the former includes a condition check unit 255' instead of the phasor unit 255 of the example embodiment shown in FIG. 8, and the remaining components are substantially the same.

The condition check unit 255' may perform a condition check to determine whether to apply the sharpening filter unit 256 to the reconstructed green signal IMG_G. For example, the condition check unit 255' may calculate a noise level of the reconstructed green signal IMG_G. The selection unit 257 may apply the sharpening filter unit 256 to the reconstructed green signal IMG_G when the noise level calculated by the condition check unit 255' is less than or equal to a preset threshold value.

Figure 15:
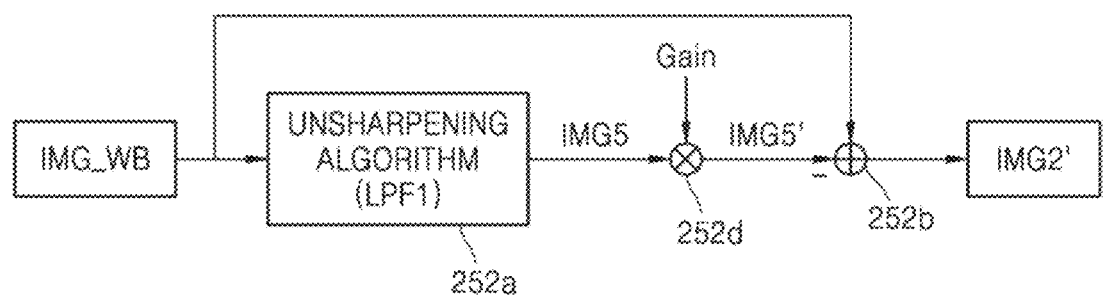
FIG. 15 is a block diagram for performing an unsharpening filtering algorithm according to another example embodiment.

FIG. 15 is a block diagram for performing an unsharpening filtering algorithm according to another example embodiment.

Referring to FIGS. 10A and 15, the example embodiment shown in FIG. 15 is different from the example embodiment shown in FIG. 10A in that the former further includes a multiplier 252d between the unsharpening algorithm execution unit 252a and the operator 252b, and the remaining components are substantially the same.

The direction image generation unit 252 may include an unsharpening algorithm execution unit 252a, a multiplier 252d, and an operator 252b. The unsharpening algorithm execution unit 252a outputs a fifth image IMG5 as a result of receiving and filtering the white balance-processed input image IMG_WB. In this case, filtering may use a first low pass filter LPF1 for passing an image signal through a low pass filter.

The multiplier 252d may multiply the fifth image IMG5 by a gain. In this case, the gain may be a coefficient determining the intensity of the unsharpening mask filter. For example, when the gain is 2, it may indicate an operation of applying double the effect of the unsharpening mask filter.

The operator 252b may generate the second 'image IMG2' by calculating the white balance-processed input image IMG_WB and the gain-multiplied output of the unsharpening algorithm execution unit 252a. For example, the operator 252b may generate a second image IMG2 by subtracting the fifth 'image IMG5', which is the gain-applied output of the unsharpening algorithm execution unit 252a, from the white balance-processed input image IMG_WB.

Figure 16:
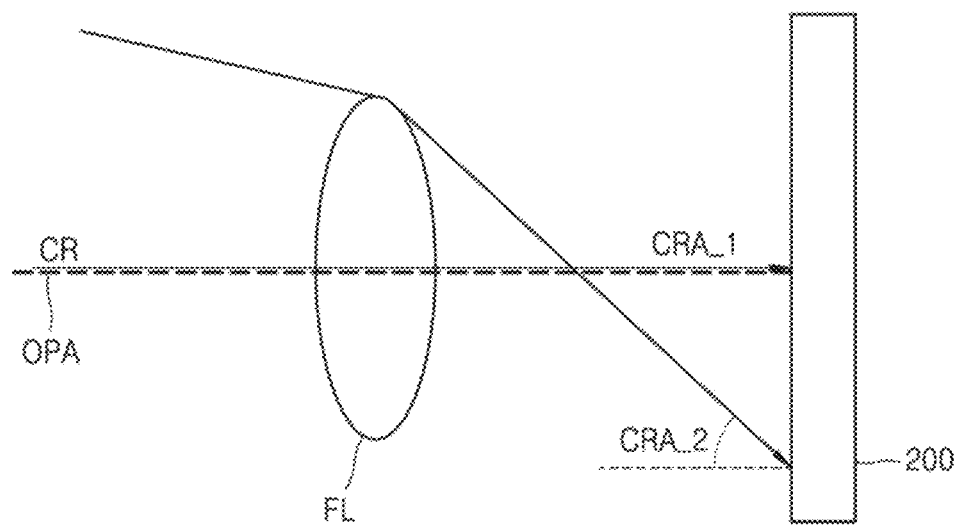
FIG. 16 is a diagram illustrating a chief ray angle of an image sensor.

FIG. 16 is a diagram illustrating a chief ray angle of an image sensor.

Referring to FIGS. 5 and 16, the angle of incidence of light incident on the image sensor 200 may be the chief ray angle (CRA). The chief ray CR refers to a light ray that enters the image sensor 200 through the center of an objective lens FL (or module lens) from one point of a subject.

The chief ray angle refers to the angle formed by the chief ray CR with the optical axis OPA of the objective lens FL, and may be the same as the angle of incidence of the chief ray CR incident on the image sensor 200. For example, the chief ray CR of light starting from a point on the optical axis of the objective lens FL vertically enters the central portion of the image sensor 200, and in this case, the chief ray angle CRA_1 is 0°. As the starting point moves away from the optical axis OPA of the objective lens FL, the chief ray angle CRA_2 increases and enters the edge of the image sensor 200. From the perspective of the image sensor 200, the chief ray angle CRA_1 of light entering the central portion of the image sensor 200 is 0°, and the further away from the center of the image sensor (200), the larger the chief ray angle CRA_2 of the incident light.

However, the color separation lens array 300 described above may generally have directionality with respect to incident light. For example, the color separation lens array 300 operates efficiently for light entering within a specific angle range, but when the angle of incidence is away from a specific angle range, the color separation performance of the color separation lens array 300 may decrease.

As such, since the light efficiency of the color separation lens array 300 decreases in the region where the chief ray angle increases, the image sensor 200 requires image processing (or signal processing) to overcome this shortcoming. The selection unit 257 in FIG. 8 according to an example embodiment may generate a third image IMG3 based on field information of the chief ray angle of the image sensor 200. For example, the greater the chief ray light angle, the stronger the blur signal by the color separation lens array 300, so the greater the chief ray angle, the greater the degree of improvement in spatial resolution may be made by the selection unit 257. The selection unit 257 may receive field information of the chief ray angle from an external device.

Figure 17:
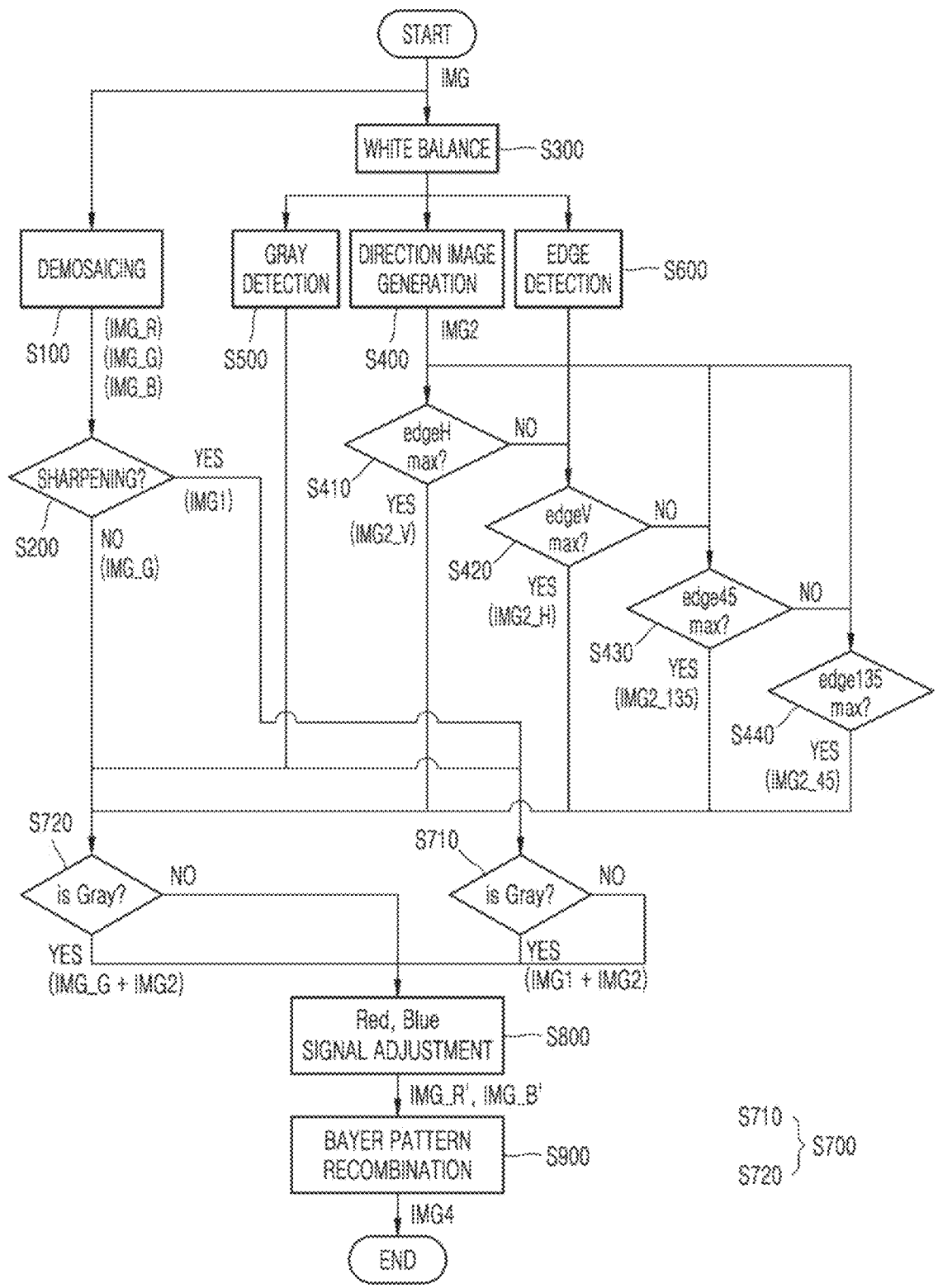
FIG. 17 is a flowchart illustrating a resolution improvement method according to an example embodiment.

FIG. 17 is a flowchart illustrating a resolution improvement method according to an example embodiment. In this case, since the flowchart illustrated in FIG. 17 corresponds to the operation of the block diagram of the signal processing unit illustrated in FIG. 8, the example embodiments described in FIGS. 8 to 16 may be applied.

Referring to FIGS. 8 to 10B and 17, a method of obtaining an image according to an example embodiment may include an operation (S100) of performing demosaicing to reconstruct a green signal to have an full pixel resolution using an input image IMG_IN; a sharpening filtering operation (S200) of generating a first image IMG1 by sharpening the reconstructed green signal IMG_G for each preset direction; a white balance-processing operation (S300) of performing white balance processing on the input image IMG_IN; a direction image generation operation (S400) of generating a second image IMG2 by removing a base band and extracting only a detail band, from the white balance-processed input image IMG_WB for each preset direction by using an unsharpening filtering algorithm; a gray detection operation (S500) of detecting a gray region of the white balance-processed input image IMG_WB; an edge detection operation (S600) of detecting an edge direction of the white balance-processed input image IMG_WB; and a selection operation (S700) of generating a third image IMG3 by blending the first image IMG1 and the second image IMG2 based on the detected gray region and the detected edge direction.

The method of obtaining an image according to an example embodiment may include an adjustment operation (S800) of adjusting the red signal IMG_R and the blue signal IMG_B based on a change amount of the green signal of the third image IMG3.

The method of obtaining an image according to an example embodiment may include a Bayer recombination operation (S900) that combines the green signal of the third image IMG with the adjusted red signal IMG_R' and the adjusted blue signal IMG_B' to generate a fourth image IMG4 with a Bayer pattern array.

In order to reduce the capacity of the memory 180 used in the operation, the operation (S100) of performing demosaicing may include performing color interpolation only on the green signal of the input image IMG_IN to generate a reconstructed green signal IMG_G with full pixel resolution.

The sharpening filtering operation (S200) may include detecting the edge direction of the reconstructed green signal IMG_G, but may include improving the edge of the first image IMG1 corresponding to the detected edge direction when the edge strength of the reconstructed green signal IMG_G is greater than or equal to a preset value. In this case, the first image IMG1 may include a first image IMG1 filtered in a horizontal direction, a first image IMG1 filtered in a vertical direction, a first image IMG1 filtered in a 45° diagonal direction, and a first image IMG1 filtered in a 135° diagonal direction.

In the white balance processing operation (S300), the gains of R and B may be adjusted around G so that the ratio of RGB (Red, Green, Blue) in the gray region is the same under various color temperature lighting (e.g., R=G=B).

The direction image generation operation (S400) may use the unsharpening filtering algorithm to remove the baseband of the white balance-processed input image IMG_WB for each preset direction and to extract only the detail band thereof to thus generate a second image IMG2. In this case, the preset direction may be a horizontal direction, a vertical direction, a 45° diagonal direction, and a 135° diagonal direction. That is, the second image IMG2 may include a second image IMG2_H filtered in a horizontal direction, a second image IMG2_V filtered in a vertical direction, a second image IMG2_45 filtered in a 45° diagonal direction, and a second image IMG2_135 filtered in a 135° diagonal direction.

In the gray detection operation (S500), a gray region of the white balance-processed input image IMG_WB may be detected.

The edge detection operation (S600) may detect the edge direction of the white balance-processed input image IMG_WB by sequentially calculating the edge maximum value for each preset direction. For example, the edge detection unit 254 may determine that the edge direction is vertical when the edge maximum value is detected in the horizontal direction, the edge direction is horizontal when the edge maximum value is detected in the vertical direction, the edge direction is 135° when the edge maximum value is detected in the 45° direction, and the edge direction is 45° when the edge maximum value is detected in the 135° direction.

The selection operation (S700) may include an operation (S710) of determining the presence or absence of a gray region in the white balance-processed input image IMG_WB, when the edge strength of the reconstructed green signal IMG_G is greater than or equal to a preset value, improving the edge by using the second image IMG2 corresponding to the determined edge direction, when the gray region is present in the white balance-processed input image IMG_WB, and generating a third image IMG3 by blending the first image and the edge-improved second image IMG2.

The selection operation (S700) may include an operation (S720) of determining the presence or absence of a gray region in the white balance-processed input image IMG_WB, when the edge strength of the reconstructed green signal IMG_G is less than the preset value, improving the edge by using the second image IMG2 corresponding to the determined edge direction, when the gray region is present in the white balance-processed input image IMG_WB, and generating a third image IMG3 by blending the reconstructed green signal IMG_G and the edge-improved second image IMG2.

Figure 18:
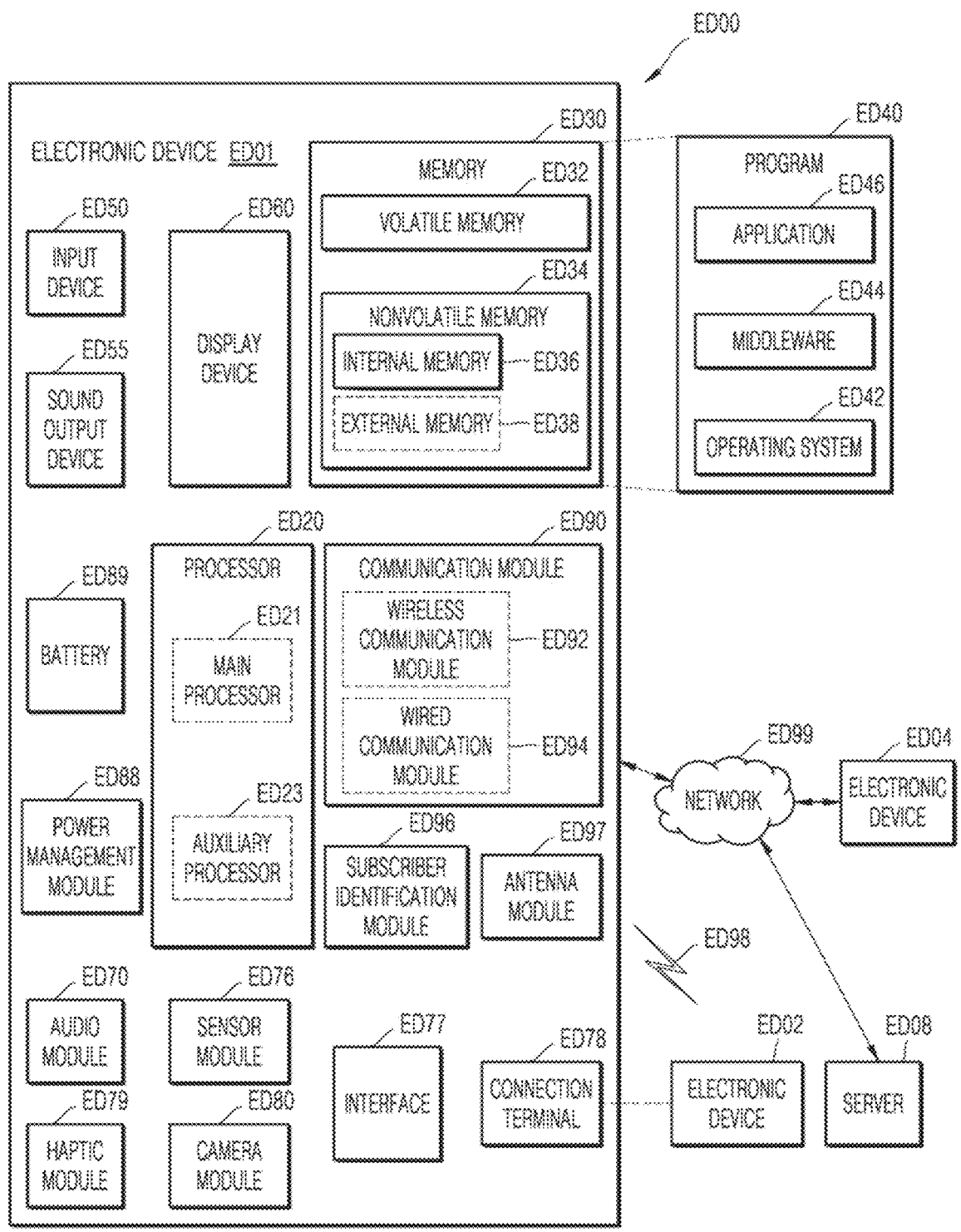
FIG. 18 is a block diagram schematically illustrating an electronic apparatus including an image sensor according to example embodiments.

FIG. 18 is a block diagram schematically illustrating an electronic apparatus including an image sensor according to example embodiments. Referring to FIG. 18, in a network environment ED00, an electronic device ED01 may communicate with another electronic device ED02 through a first network ED98 (a short-range wireless communication network or the like), or with another electronic device 2204 and/or a server ED08 through a second network ED99 (a long-range wireless communication network or the like). The electronic apparatus ED01 may communicate with the electronic apparatus 8204 through the server ED08. The electronic apparatus ED01 may include a processor ED20, a memory ED30, an input device ED50, an audio output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. Some (such as the display device ED60) of these components may be omitted from or other components may be added to the electronic device ED01. Some of these components may be implemented as one integrated circuit. For example, the sensor module ED76 (fingerprint sensor, iris sensor, illumination sensor, etc.) may be implemented by being embedded in the display device ED60 (display, etc.).

The processor ED20 may execute software (program ED40 or the like) to control one or a plurality of other components (hardware and software components, or the like) of the electronic device ED01 connected to the processor ED20, and may perform processing or operations of various data. As part of data processing or operation, the processor ED20 may load commands and/or data received from other components (sensor modules ED76, communication modules (ED90, etc.), process commands and/or data stored in volatile memory ED32, and store the result data in nonvolatile memory ED34 that includes an internal memory ED36 and an external memory ED38. The processor ED20 may include a main processor ED21 (a central processing unit, an application processor, etc.) and an auxiliary processor ED23 (a graphics processing unit, an image signal processor, a sensor hub processor, a communication processor, etc.) that may be operated independently of or together with the main processor ED21. The auxiliary processor ED23 may use less power than the main processor ED21 and perform a specialized function.

The auxiliary processor ED23 may control functions and/or states related to some (the display device ED60, sensor module ED10, communication module ED90, etc.) of the components of the electronic apparatus ED01, in place of the main processor ED21 while the main processor ED21 is in an inactive state (slip state), or together with the main processor ED21 while the main processor ED21 is in an active state (application execution state). The auxiliary processor ED23 (image signal processor, communication processor, etc.) may be implemented as part of other functionally related components (camera module 8280, communication module 8290, etc.).

The memory ED30 may store various data required by components (processor ED20 and sensor module ED76) of the electronic apparatus ED01. The data may include, for example, input data and/or output data for software (program ED40 or the like) and related commands. The memory ED30 may include a volatile memory ED32 and/or a non-volatile memory ED34.

The program ED40 may be stored in the memory ED30 as software, and may include an operating system ED42, middleware ED44, and/or an application ED46.

The input device ED50 may receive commands and/or data to be used in components (processor ED20, etc.) of the electronic apparatus ED01 from the outside (user, etc.) of the electronic apparatus ED01. The input device ED50 may include a microphone, a mouse, a keyboard, and/or a digital pen (such as a stylus pen, etc.).

The sound output device ED55 may output the sound signal to the outside of the electronic apparatus ED01. The sound output device ED55 may include a speaker and/or a receiver. Speakers may be used for general purposes such as multimedia playback or recording playback, and receivers may be used to receive incoming calls. The receiver may be coupled as part of a speaker or may be implemented as an independent separate device.

The display device ED60 may visually provide information to the outside of the electronic device ED01. The display device ED60 may include a display, a hologram device, or a projector and a control circuit for controlling the corresponding devices. The display device ED60 may include a touch circuitry configured to sense a touch, and/or a sensor circuit (a pressure sensor, etc.) configured to measure an intensity of a force generated by the touch.

The audio module ED70 may convert sound into an electrical signal or conversely convert the electrical signal into sound. The audio module ED70 may acquire sound through the input device ED50 or output sound through the sound output device ED55 and/or a speaker and/or a headphone of another electronic apparatus (e.g., electronic apparatus ED02, etc.) directly or wirelessly connected to the electronic apparatus ED01.

The sensor module ED76 may detect an operating state (power, temperature, etc.) or an external environmental state (user state, etc.) of the electronic apparatus ED01 and generate an electrical signal and/or a data value corresponding to the sensed state. The sensor module ED76 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illumination sensor.

The interface ED77 may support one or more designated protocols that may be used for electronic apparatus ED01 to be directly or wirelessly connected to another electronic apparatus (e.g., electronic apparatus ED02, etc.). The interface ED77 may include a high definition multimedia interface (HDMI), a universal serial bus (USB) interface, an SD card interface, and/or an audio interface.

The connection terminal ED78 may include a connector through which the electronic apparatus ED01 may be physically connected to another electronic apparatus (e.g., electronic apparatus ED02, etc.). The connection terminal ED78 may include an HDMI connector, a USB connector, an SD card connector, and/or an audio connector (such as a headphone connector, etc.).

The haptic module ED79 may convert an electrical signal to a mechanical stimulus (vibration, motion, etc.) or an electrical stimulus that a user can recognize through a tactile or motion sensation. The haptic module ED79 may include a motor, a piezoelectric element, and/or an electrical stimulus.

The camera module ED80 may capture a still image and a moving image. The camera module ED80 may include a lens assembly including one or more lenses, image sensors, image signal processors, and/or flashes. The lens assembly included in the camera module ED80 may concentrate light emitted from an object to be photographed.

The power management module ED88 may manage power supplied to the electronic apparatus ED01. The power management module ED88 may be implemented as part of a power management integrated circuit (PMIC).

The battery ED89 may supply power to components of the electronic apparatus ED01. The battery ED89 may include a non-rechargeable primary battery, a rechargeable secondary battery, and/or a fuel cell.

The communication module ED90 may establish a direct (wired) communication channel and/or wireless communication channel between the electronic apparatus ED01 and another electronic apparatus (the electronic apparatus ED02, the electronic apparatus ED04, the server ED08, etc.), and support communication execution through the established communication channel. The communication module ED90 may include one or more communication processors that operate independently of the processor ED20 (application processor, etc.) and support direct communication and/or wireless communication. The communication module ED90 may include a wireless communication module ED92 (a cellular communication module, a short-range wireless communication module, a GNSS (Global Navigation Satellite System, etc.) communication module, and/or a wired communication module ED94 (a local area network (LAN) communication module, a power line communication module, etc.). A corresponding communication module of these communication modules may communicate with other electronic apparatuses through a first network ED98 (a short-range communication network such as Bluetooth, WiFi Direct, or infrared data association (IrDA)), or a second network ED99 (a long-range communication network such as a cellular network, Internet, or computer network (LAN, WAN, etc.)). These various types of communication modules may be integrated into a single component (such as a single chip, etc.), or may be implemented as a plurality of separate components (multiple chips). The wireless communication module ED92 may identify and authenticate the electronic apparatus ED01 in a communication network such as a first network ED98 and/or a second network ED99 using subscriber information (such as an international mobile subscriber identifier (IMSI) stored in the subscriber identification module ED96.

The antenna module ED97 may transmit a signal and/or power to the outside (such as another electronic apparatus, etc.) or receive the signal and/or power from the outside. The antenna may include a radiator formed of a conductive pattern formed on the substrate (PCB, etc.). The antenna module ED97 may include one or a plurality of antennas. When a plurality of antennas are included, an antenna suitable for a communication scheme used in a communication network such as a first network ED98 and/or a second network ED99 may be selected from among the plurality of antennas by the communication module ED90. A signal and/or power may be transmitted or received between the communication module ED90 and another electronic apparatus through the selected antenna. Other components (RFIC, etc.) in addition to the antenna may be included as a part of the antenna module ED97.

Some of the components are connected to each other and may exchange signals (commands, data, etc.) via a communication scheme (bus, General Purpose Input and Output (GPIO), Serial Peripheral Interface (SPI), Mobile Industry Processor Interface (MIPI), etc.) and can interchange signals (commands, data, etc.) between peripherals.

The command or data may be transmitted or received between the electronic apparatus ED01 and the external electronic apparatus ED04 through the server ED08 connected to the second network ED99. Other electronic apparatuses ED02 and ED04 may be the same or different types of apparatuses as the electronic apparatus ED01. All or some of the operations executed in the electronic apparatus ED01 may be executed in one or more of the other electronic apparatuses ED02, ED04, and ED08. For example, when the electronic apparatus ED01 needs to perform a function or service, it may request one or more other electronic apparatuses to perform part or all of the function or service instead of executing the function or service on its own. One or more other electronic apparatuses receiving the request may execute an additional function or service related to the request and transmit a result of the execution to the electronic apparatus ED01. To this end, cloud computing, distributed computing, and/or client-server computing technology may be used.

Figure 19:
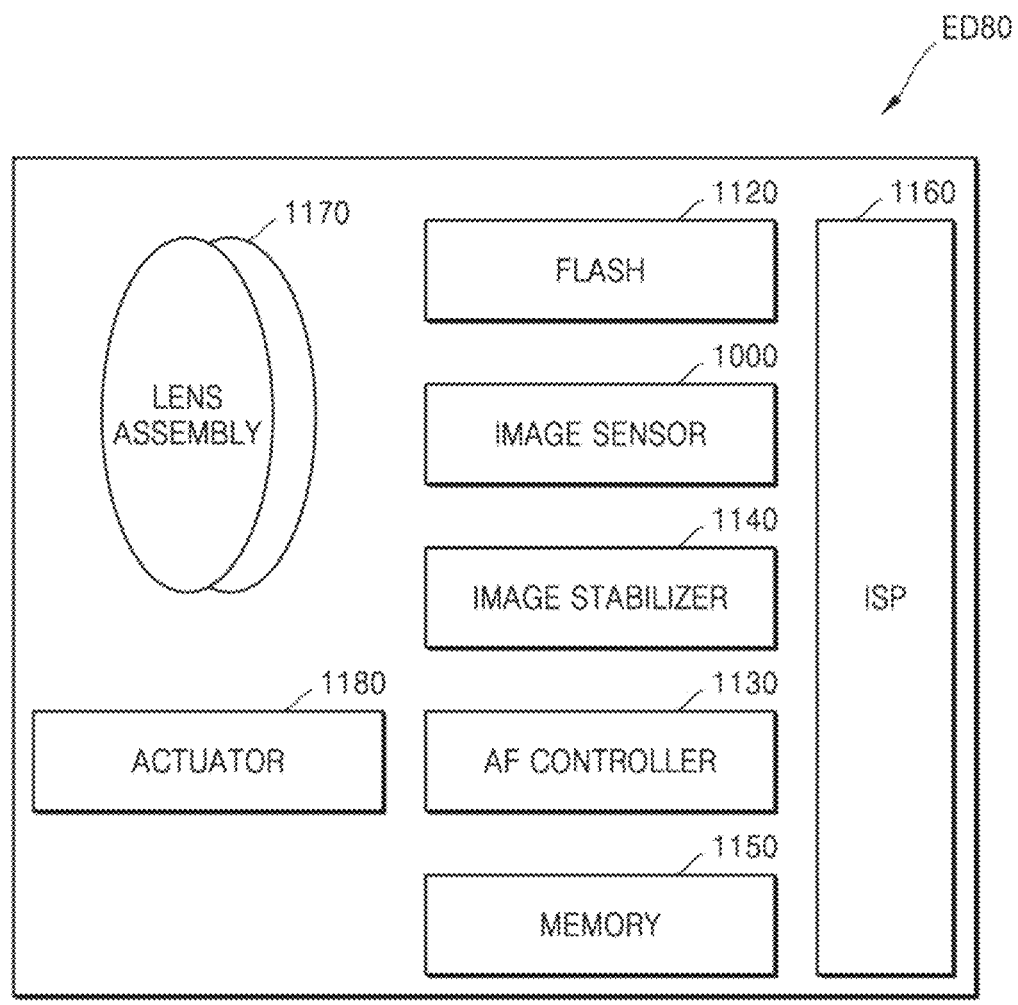
FIG. 19 is a block diagram illustrating a camera module provided in the electronic apparatus of FIG. 18.

FIG. 19 is a block diagram illustrating a camera module ED80 provided in the electronic apparatus of FIG. 18. Referring to FIG. 19, the camera module ED80 may include a lens assembly 1170, a flash 1120, an image sensor 200, an image stabilizer 1140, an auto-focus (AF) control unit 1130, a memory 1150 (buffer memory, etc.), an actuator 1180 and/or an image signal processor (ISP) 1160.

The lens assembly 1170 may concentrate light emitted from a subject that is an object of image photographing. The lens assembly 1170 may include one or more optical lenses. The lens assembly 1170 may include a path switching member that deflects the path of light to face the image sensor 200. Depending on the arrangement of the path switching member and the arrangement form with the optical lens, the camera module ED80 may have a vertical form or a folded form. The camera module ED80 may include a plurality of lens assemblies 1170, and in this case, the camera module ED80 may be a dual camera, a 360° camera, or a spherical camera. Some of the plurality of lens assemblies 1170 may have the same lens attributes (view angle, focal distance, automatic focus, F Number, optical zoom, etc.) or other lens attributes. The lens assembly 1170 may include a wide-angle lens or a telephoto lens.

The actuator 1180 may drive the lens assembly 1170. For example, at least some of the optical lenses and the path switching members constituting the lens assembly 1170 may move by the actuator 1180. The optical lens may move along the optical axis and adjust the distance between adjacent lenses by moving at least part of the optical lenses included in the lens assembly 1170, thereby adjusting the optical zoom ratio.

The actuator 1180 may adjust the position of any one optical lens included in the lens assembly 1170 so that the image sensor 200 is located at the focal length of the lens assembly 1170. The actuator 1180 may drive the lens assembly 1170 according to the AF driving signal transmitted from the AF controller 1130.

The flash 1120 may emit light used to enhance light emitted or reflected from the subject. The flash 1120 may emit visible light or infrared light. Flash (1120) may include one or more light-emitting diodes (RGB (Red-Green-Blue) LED, White LED, Infrared LED, Ultraviolet LED, etc.), and/or a Xenon Lamp. The image sensor 200 may be the image sensor 200 described in FIG. 1, or any one of the image sensors 1001 and 1012 described above, or a combination or modified form thereof. The image sensor 200 may obtain an image corresponding to a subject by converting light emitted or reflected from the subject and transmitted through the lens assembly 1170 into an electrical signal.

The image sensor 200 is equipped with the color separation lens array 300 described above, and each pixel may include a plurality of light sensing cells that form a plurality of channels, for example, a plurality of light sensing cells arranged in a 2×2 matrix. Some of these pixels may be used as AF pixels, and the image sensor 200 may generate AF driving signals from signals from the plurality of channels in the AF pixels.

In response to the movement of the camera module ED80 or the electronic device ED01 including the camera module ED80, the image stabilizer 1140 may move one or more lenses or image sensors 200 included in the lens assembly 1170 in a specific direction or control the operating characteristics of the image sensor 200 (such as adjusting the read-out timing), to thereby compensate for the negative effects caused due to movement. The image stabilizer 1140 may detect the movement of the camera module ED80 or the electronic device ED01 using a gyro sensor (not shown) or an acceleration sensor (not shown) placed inside or outside the camera module ED80. The image stabilizer 1140 may be implemented optically.

The AF controller 1130 may generate an AF driving signal from a signal value sensed from the AF pixel of the image sensor 200. The AF controller 1130 may control the actuator 1180 according to the AF driving signal.

The memory 1150 may store some or all data of the image acquired through the image sensor 200 for the next image processing operation. For example, if a plurality of images are acquired at high speed, the acquired original data (Bayer-Patterned data, high-resolution data, etc.) may be stored in memory 1150, only low-resolution images may be displayed, and the original data of the selected image may then be transmitted to the image signal processor 1160. The memory 1150 may be integrated into the memory ED30 of the electronic device ED01 or may be configured as a separate memory that is operated independently.

The image signal processor (ISP) 1160 may perform image processing on the image acquired through the image sensor 200 or image data stored in the memory 1150. The image processing may include depth map generation, three-dimensional modeling, panoramic generation, feature point extraction, image synthesis, and/or image compensation (noise reduction, resolution adjustment, brightness adjustment, blurring, sharpening, softening, etc.). The image signal processor 1160 may perform control (exposure time control, read-out timing control, etc.) on components (image sensor 200, etc.) included in the camera module ED80. The image processed by the image signal processor 1160 may be stored again in the memory 1150 for further processing or may be provided to external components (memory ED30, display device ED60, electronic device ED02, electronic device ED04, server ED08, etc.) of the camera module ED80. The image signal processor 1160 may be integrated into the processor ED20 or may be configured as a separate processor operated independently of the processor ED20. In the case that the image signal processor 1160 is composed of a separate processor from the processor ED20, the image processed by the image signal processor 1160 may be displayed through the display device ED60 after additional image processing by the processor ED20.

The AF controller 1130 may be integrated into the image signal processor 1160. The image signal processor 1160 may process signals from the auto-focusing pixels of the image sensor 200 to generate an AF signal, and the AF control unit 1130 may convert the AF signal into an AF driving signal for driving the actuator 1180 and transmit the converted result to the actuator 1180.

The image sensor 200 according to example embodiments may be applied to various electronic devices.

The image sensor 200 according to example embodiments may be applied to a mobile phone or a smartphone, a tablet or a smart tablet, a digital camera or camera recorder (called a camcorder), a laptop computer, a television, a smart television, or the like. For example, the smartphone or smart tablet may include a plurality of high-resolution cameras each equipped with a high-resolution image sensor. High-resolution cameras may be used to extract depth information from subjects in the image, adjust the out-focusing of the image, or automatically identify subjects in the image.

In addition, the image sensor 200 may be applied to a smart refrigerator, a security camera, a robot, a medical camera, and the like. For example, the smart refrigerator may automatically recognize food in the refrigerator using an image sensor and inform the user of the presence of a specific food, the type of food received or taken out, etc. through a smartphone. Security cameras may provide ultra-high-resolution images and may use high sensitivity to recognize objects or people in the images even in dark environments. Robots may be deployed at a disaster or industrial site to which people do not directly access to provide high-resolution images. Medical cameras may provide high-resolution images for diagnosis or surgery and may dynamically adjust the field of view.

In addition, the image sensor 200 may be applied to vehicles. The vehicle may include a plurality of vehicle cameras arranged at various positions. Each vehicle camera may include an image sensor according to an example embodiment. The vehicle may provide the driver with various information about the inside or surroundings of the vehicle using the plurality of vehicle cameras, and may automatically recognize objects or people in the image to provide information necessary for autonomous driving.

The image sensor with the color separation lens array and the for obtaining an image including the image sensor have been described with reference to the example embodiments illustrated in the drawings, but the apparatus and method for obtaining an image according to the example embodiments may perform a plurality of filtering processes, to improve the spatial resolution of the image while maintaining the light efficiency improvement effect.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An apparatus for obtaining an image, comprising:
   an image sensor comprising a color separation lens array configured to separate and concentrate incident light based on a color of the incident light; and
   a signal processor configured to process an input image obtained by the image sensor,
   wherein the signal processor configured to be implemented as:
      a demosaicing unit configured to reconstruct a green signal to have a full pixel resolution based on the input image;
      a sharpening filter unit configured to generate a first image by sharpening the reconstructed green signal for each preset direction;
      a direction image generation unit configured to perform white balance processing on the input image, and generate a second image by removing a base band and extracting a detail band from the white balance-processed input image for each preset direction based on an unsharpening filtering algorithm;
      a gray detection unit configured to perform white balance processing on the input image and detect a gray region of the white balance-processed input image;
      an edge detection unit configured to perform white balance processing on the input image and detect an edge direction of the white balance-processed input image; and
      a selection unit configured to generate a third image by blending the first image and the second image based on the detected gray region and the detected edge direction.

2. The apparatus for obtaining the image of claim 1, wherein the image sensor comprises:
   a sensor substrate comprising a plurality of light sensing cells configured to sense light, and
   wherein the color separation lens array is on the sensor substrate and comprises a microstructure that forms a phase distribution configured to concentrate light of different wavelengths in light sensing cells, among the plurality of light sensing cells, adjacent to each other.

3. The apparatus for obtaining the image of claim 1, wherein the image sensor comprises a Bayer pattern array.

4. The apparatus for obtaining an image of claim 1, wherein the signal processor is further configured to be implemented as an adjustment unit configured to adjust a red signal and a blue signal, based on an amount of change of the green signal of the third image.

5. The apparatus for obtaining the image of claim 4, wherein the signal processor is further configured to be implemented as a Bayer recombination unit configured to combine the green signal of the third image with the adjusted red signal and the adjusted blue signal to generate a fourth image having a Bayer pattern array.

6. The apparatus for obtaining the image of claim 1, wherein the signal processor is further configured to be implemented as a phasor unit configured to detect an edge direction of the reconstructed green signal.

7. The apparatus for obtaining the image of claim 6, wherein the selection unit is further configured to increase an edge resolution of the first image corresponding to the edge direction detected by the phasor unit based on an edge strength of the reconstructed green signal being greater than or equal to a preset value.

8. The apparatus for obtaining the image of claim 7, wherein the selection unit is further configured to determine, by the gray detection unit, whether the gray region exists in the white balance-processed input image based on the edge strength of the reconstructed green signal being greater than or equal to the preset value.

9. The apparatus for obtaining the image of claim 8, wherein the selection unit is further configured to, based on the gray region existing in the white balance-processed input image, increase edge resolution based on the second image corresponding to the edge direction determined by the edge detection unit and generate the third image by blending the first image and the edge resolution increased second image.

10. The apparatus for obtaining the image of claim 7, wherein the selection unit is further configured to determine, by the gray detection unit, whether the gray region exists in the white balance-processed input image based on the edge strength of the reconstructed green signal being less than the preset value.

11. The apparatus for obtaining the image of claim 10, wherein the selection unit is further configured to, based on the gray region existing in the white balance-processed input image, increase edge resolution based on the second image corresponding to the edge direction determined by the edge detection unit and generate the third image by blending the reconstructed green signal and the edge resolution increased second image.

12. The apparatus for obtaining the image of claim 1, wherein the preset direction comprises a horizontal direction, a vertical direction, a 45° direction, and a 135° direction.

13. The apparatus for obtaining the image of claim 1, wherein the direction image generation unit comprises:
a low-pass filter configured to generate a fifth image by performing low-frequency filtering on the white balance-processed input image; and
an operator configured to receive the white balance-processed input image and the fifth image, and subtract the fifth image from the white balance-processed input image.

14. The apparatus for obtaining the image of claim 13, wherein the direction image generation unit further comprises a multiplier between the low-pass filter and the operator, the multiplier being configured to multiply the fifth image by a gain.

15. The apparatus for obtaining the image of claim 13, wherein the direction image generation unit further comprises a high-pass filter configured to detect a limit resolution of the white balance-processed input image.

16. The apparatus for obtaining the image of claim 1, wherein the edge detection unit comprises a low-pass filter configured to remove noise from the white balance-processed input image.

17. The apparatus for obtaining the image of claim 1, wherein the selection unit is further configured to generate the third image based on field information corresponding to a chief ray angle of the image sensor.

18. The apparatus for obtaining the image of claim 1, wherein the direction image generation unit, the gray detection unit, and the edge detection unit are disposed in parallel and share a memory with the demosaicing unit.

19. A method of obtaining an image in an apparatus configured to obtain an image, the apparatus comprising an image sensor comprising a color separation lens array configured to separate and concentrate incident light based on a color of the incident light, the method comprising:
demosaicing a green signal to reconstruct the green signal to have a full pixel resolution based on the input image;
generating a first image by sharpening the reconstructed green signal for each preset direction;
performing white balance processing on the input image;
generating a second image by removing a base band and extracting a detail band from the white balance-processed input image for each preset direction based on an unsharpening filtering algorithm;
detecting a gray region of the white balance-processed input image;
detecting an edge direction of the white balance-processed input image; and
generating a third image by blending the first image and the second image based on the detected gray region and the detected edge direction.

20. The method of obtaining the image of claim 19, further comprising adjusting a red signal and a blue signal based on an amount of change of the green signal of the third image.

* * * * *